US012726543B2

(12) United States Patent
El Essaili et al.

(10) Patent No.: US 12,726,543 B2
(45) **Date of Patent: *Sep. 1, 2026**

(54) METHODS PROVIDING V2X APPLICATION SERVER REGISTRATION

(71) Applicant: Telefonaktiebolaget LM Ericsson (publ), Stockholm (SE)

(72) Inventors: Ali El Essaili, Aachen (DE); Yunpeng Zang, Wuerselen (DE); Massimo Condoluci, Solna (SE); Wenliang Xu, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 32 days.

This patent is subject to a terminal disclaimer.

(21) Appl. No.: 18/939,986

(22) Filed: Nov. 7, 2024

(65) Prior Publication Data

US 2025/0063090 A1 Feb. 20, 2025

Related U.S. Application Data

(63) Continuation of application No. 17/772,634, filed as application No. PCT/EP2020/079376 on Oct. 19, 2020, now Pat. No. 12,177,299.

(30) Foreign Application Priority Data

Nov. 4, 2019 (WO) ................ PCT/CN2019/115329

(51) Int. Cl.
*H04L 67/12* (2022.01)

(52) U.S. Cl.
CPC .................................. *H04L 67/12* (2013.01)

(58) Field of Classification Search
CPC .......... H04L 67/12; H04W 4/44; H04W 4/40; H04W 4/029
See application file for complete search history.

(56) References Cited

U.S. PATENT DOCUMENTS

| | | | |
|---|---|---|---|
| 2008/0066190 | A1 | 3/2008 | Shu et al. |
| 2008/0317010 | A1 | 12/2008 | Naqvi et al. |
| 2013/0212195 | A1 | 8/2013 | Bonefas et al. |
| 2015/0189615 | A1 | 7/2015 | Rembarz et al. |

(Continued)

FOREIGN PATENT DOCUMENTS

| | | | |
|---|---|---|---|
| CN | 102984678 | A | 3/2013 |
| WO | 2001016843 | A2 | 3/2001 |
| WO | 2007024188 | A1 | 3/2007 |

OTHER PUBLICATIONS

Notice of Allowance, Chinese Patent Application for Invention No. 202211313404.7, mailed Jul. 30, 2025, 4 pages.

(Continued)

*Primary Examiner* — Tonia L Dollinger
*Assistant Examiner* — Linh T. Nguyen
(74) *Attorney, Agent, or Firm* — Sage Patent Court

(57) ABSTRACT

A method of operating a vehicle to anything, V2X, application enabler, VAE, server is provided according to some embodiments disclosed herein. The method includes receiving a registration request message from a V2X application specific server. The method further includes transmitting a registration response message to the V2X application specific server responsive to receiving the registration request message.

20 Claims, 29 Drawing Sheets

(56) References Cited

U.S. PATENT DOCUMENTS

| | | | | |
|---|---|---|---|---|
| 2015/0271659 | A1 | 9/2015 | Ma et al. | |
| 2017/0288886 | A1 | 10/2017 | Atarius et al. | |
| 2018/0159935 | A1 | 6/2018 | Cavalcanti et al. | |
| 2018/0324560 | A1* | 11/2018 | Xu | H04W 28/24 |
| 2019/0104530 | A1 | 4/2019 | Deng | |
| 2019/0124489 | A1* | 4/2019 | Ahmad | H04W 4/06 |
| 2019/0342422 | A1 | 11/2019 | Li | |
| 2020/0059767 | A1* | 2/2020 | Woo | H04W 4/027 |
| 2020/0092685 | A1* | 3/2020 | Fehrenbach | H04W 72/23 |
| 2020/0178048 | A1 | 6/2020 | Kim et al. | |
| 2022/0103990 | A1 | 3/2022 | Xing et al. | |

OTHER PUBLICATIONS

3GPP TSG-SA WG6 Meeting #31, "pCR Information flows V2X message distribution," S6-190949, 3GPP TS 23.286 v 1.1.0, May 20-24, 2019, Bruges, Belgium, 4 pages.
Second Office Action, Indian Patent Application No. 202217024915, mailed Feb. 21, 2025, 4 pages.
International Search Report and Written Opinion of the International Searching Authority, PCT/EP2020/079376, mailed Dec. 21, 2020, 16 pages.
Huawei et al., "Proposal for Solution to KI#2-Monitoring network situation and QoS by V2X application," 3GPP TR 23.795 v0.1.0, 9.2; S6-180416, Mobile Competence Centre: Sophia Antipolis, France, Mar. 5-9, 2018, 4 pages.
Ericsson, "CR Message Delivery," 3GPP TSG-SA WG6 Meeting #34; S6-192078, Reno, Nevada, USA, Nov. 11-15, 2019, 7 pages.
3GPP TS 23.286, V1.2.0, "3rd Generation Partnership Project; Technical Specification Group Services and System Aspects; Application layer support for V2X services; Functional architecture and information flows"; Release 16; Valbonne, France, May 2019, 60 pages.
3GPP TS 23.286, V16.1.0, "3rd Generation Partnership Project; Technical Specification Group Services and System Aspects; Application layer support for Vehicle-to-Everything (V2X) services; Functional architecture and information flows"; Release 16; Valbonne, France, Sep. 2019, 59 pages.
3GPP TS 23.434 V16.1.0, "3rd Generation Partnership Project; Technical Specification Group Services and System Aspects; Service Enabler Architecture Layer for Verticals (SEAL); Functional architecture and information flows"; Release 16, Valbonne, France, Sep. 2019, 117 pages.
3GPP TR 23.795 V16.1.0, "3rd Generation Partnership Project; Technical Specification Group Services and System Aspects; Study on application layer support for V2X services"; Release 16, Valbonne, France, Dec. 2018, 77 pages.
3GPP TR 23.764 V0.2.0, "3rd Generation Partnership Project; Technical Specification Group Services and System Aspects; Study on enhancements to application layer support for V2X services"; Release 17, Valbonne, France, Sep. 2019, 17 pages.
3GPP TS 23.287 V16.0.0, "3rd Generation Partnership Project; Technical Specification Group Services and System Aspects; Architecture enhancements for 5G System (5GS) to support Vehicle-to-Everything (V2X) services"; Release 16, Valbonne, France, Sep. 2019, 49 pages.
3GPP TS 23.288 V16.1.0, "3rd Generation Partnership Project; Technical Specification Group Services and System Aspects; Architecture enhancements for 5G System (5GS) to support network data analytics services"; Release 16, Valbonne, France, Sep. 2019, 52 pages.
3GPP TS 23.501 V16.2.0, "3rd Generation Partnership Project; Technical Specification Group Services and System Aspects; System Architecture for the 5G System (5GS); Stage 2"; Release 16, Valbonne, France, Sep. 2019, 391 pages.
3GPP TS 23.502 V16.2.0, "3rd Generation Partnership Project; Technical Specification Group Services and System Aspects; Procedures for the 5G System (5GS); Stage 2"; Release 16, Valbonne, France, Sep. 2019, 525 pages.
3GPP TS 23.503 V16.2.0, "rd Generation Partnership Project; Technical Specification Group Services and System Aspects; Policy and Charging Control Framework for the 5G System (5GS); Stage 2", Release 16, Valbonne, France, Sep. 2019, 104 pages.
LTE, "Application layer support for Vehicle-to-Everything (V2X) services; Functional architecture and information flows," 3GPP TS 23.286 version 16.4.0 Release 16, Oct. 2020, France, 68 pages.
First Office Action, CN Patent Application No. 202211313404.7, mailed Jan. 13, 2025, 9 pages.
3GPP TS 23.286, V0.1.0, "3rd Generation Partnership Project; Technical Specification Group Services and System Aspects; Application layer support for V2X services; Functional architecture and information flows"; Release 16; Nov. 2, 2018, 28 pages.
3GPP TSG-SA WG6 Meeting #29, Ericsson GmbH, Eurolab, S6-190329, "pCR V2X application server and V2X service discovery," Feb. 19, 2019, Montreal, Canada, 5 pages

* cited by examiner

V2X application-specific client A
310a
V2X application-specific client B
310b
API
VAE client 1
320a
VAE client 2
320b

| Information element | Status | Description |
|---|---|---|
| V2X application-specific server ID | M | ID of the V2X application-specific server for receiving uplink messages |
| V2X service ID | M | The V2X service ID to which the V2X application-specific server registers to |
| GEO ID | O | The geographical area to which the V2X application-specific server registers to |
| Notification reception information | M | The information of the V2X application-specific server for receiving the notifications, e.g. the unlink message. |

Figure 5

| Information element | Status | Description |
|---|---|---|
| Result | M | Result from the VAE server in response to V2X application-specific server registration request indicating success or failure |

Figure 6

| Information element | Status | Description |
|---|---|---|
| V2X group ID | M | The group ID for which the V2X message is addressed. |
| V2X message payload (see NOTE) | M | V2X message payload carried by the V2X message (e.g. ETSI ITS DENM [15]). |
| V2X service ID | M | The V2X service ID to which the V2X group message belongs to. |
| Geo ID | O | Geographical area identifier |
| Reception report required | O | Indicates whether a reception report is required for the V2X group message |
| NOTE: The V2X message is V2X application/service specific and is not specified in this specification. | | |

Figure 9

| Information element | Status | Description |
|---|---|---|
| V2X application-specific server ID | M | ID of the V2X application-specific server for receiving QoS Sustainability Analytics notifications |
| VAE Client consumer | O | Indicating whether QoS Sustainability Analytics notifications should be notified to VAE Client |
| V2X service ID | O | The V2X service ID to which the V2X application-specific server registers to |
| GEO ID | O | The geographical area to which the V2X application-specific server registers to |
| Notification reception information | M | The information of the V2X application-specific server for receiving the notifications |
| Analytics Filter Information | M | QoS requirements, Location information, Observation period, Threshold(s), S-NSSAI (optional)<br>(more information can be found in TS 23.288, clause 6.9.1) |

Figure 12

| Information element | Status | Description |
| --- | --- | --- |
| Result | M | Result from the VAE server in response to QoS Sustainability Analytics registration request indicating success or failure |

Figure 13

| Information element | Status | Description |
|---|---|---|
| V2X application-specific server ID | M | ID of the V2X application-specific server for receiving QoS Sustainability Analytics notifications |
| VAE Client consumer | O | Indicating whether QoS change based on Extended NG-RAN Notification should be notified to VAE Client |
| V2X service ID | O | The V2X service ID to which the V2X application-specific server registers to |
| GEO ID | O | The geographical area to which the V2X application-specific server registers to |
| Notification reception information | M | The information of the V2X application-specific server for receiving the notifications |
| Alternative Service Requirements | M | QoS reference parameters in a prioritized order (more information can be found in TS 23.503) |

Figure 15

| Information element | Status | Description |
|---|---|---|
| Result | M | Result from the VAE server in response to QoS change based on Extended NG-RAN Notification registration request indicating success or failure |

Figure 16

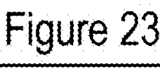
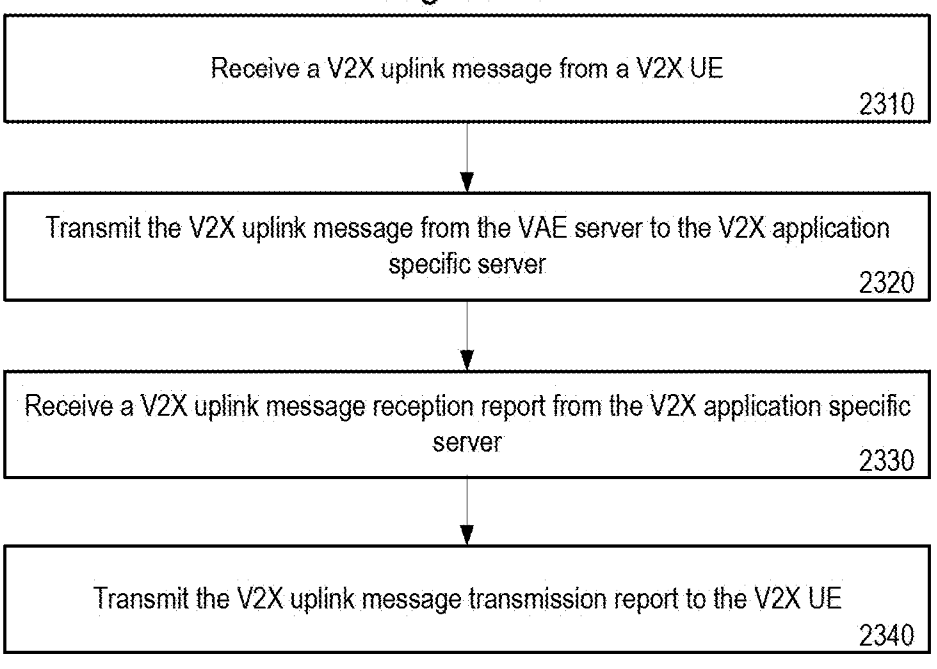
Figure 24
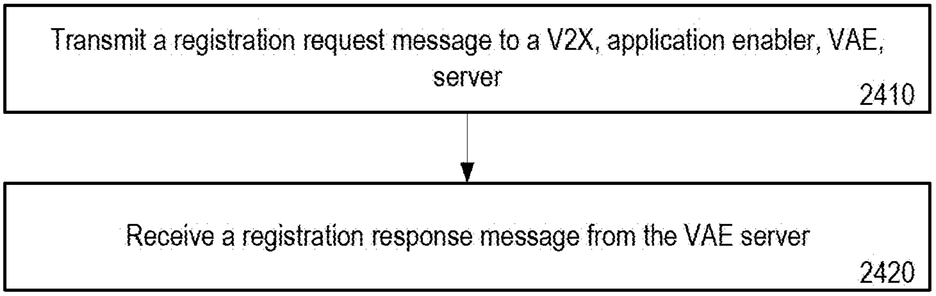
Figure 25
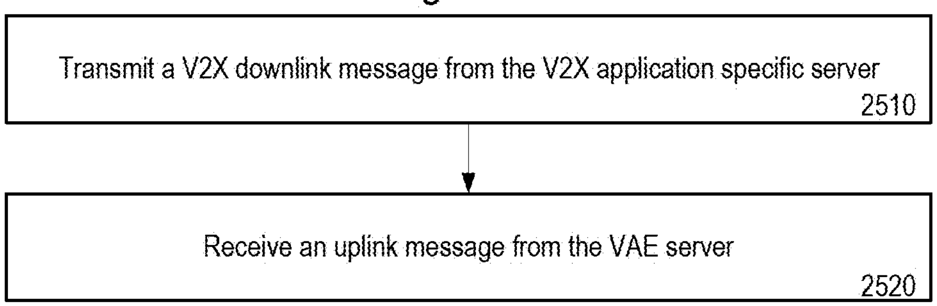

Figure 26

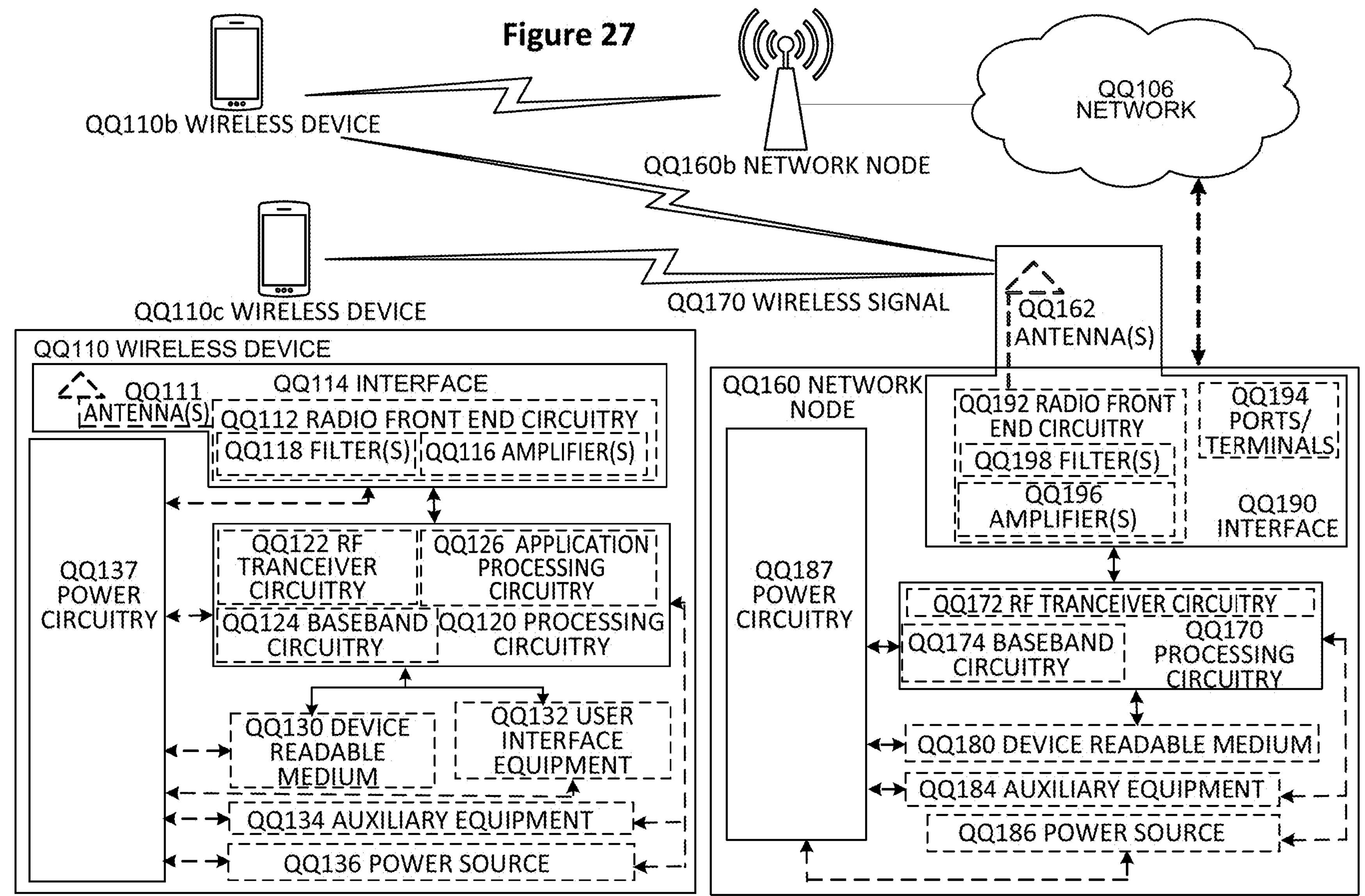
Figure 27
QQ110b WIRELESS DEVICE
QQ160b NETWORK NODE
QQ106 NETWORK
QQ110c WIRELESS DEVICE
QQ170 WIRELESS SIGNAL
QQ162 ANTENNA(S)
QQ110 WIRELESS DEVICE
QQ111 ANTENNA(S)
QQ114 INTERFACE
QQ112 RADIO FRONT END CIRCUITRY
QQ118 FILTER(S)
QQ116 AMPLIFIER(S)
QQ137 POWER CIRCUITRY
QQ122 RF TRANCEIVER CIRCUITRY
QQ126 APPLICATION PROCESSING CIRCUITRY
QQ124 BASEBAND CIRCUITRY
QQ120 PROCESSING CIRCUITRY
QQ130 DEVICE READABLE MEDIUM
QQ132 USER INTERFACE EQUIPMENT
QQ134 AUXILIARY EQUIPMENT
QQ136 POWER SOURCE
QQ160 NETWORK NODE
QQ192 RADIO FRONT END CIRCUITRY
QQ198 FILTER(S)
QQ196 AMPLIFIER(S)
QQ194 PORTS/ TERMINALS
QQ190 INTERFACE
QQ187 POWER CIRCUITRY
QQ172 RF TRANCEIVER CIRCUITRY
QQ174 BASEBAND CIRCUITRY
QQ170 PROCESSING CIRCUITRY
QQ180 DEVICE READABLE MEDIUM
QQ184 AUXILIARY EQUIPMENT
QQ186 POWER SOURCE QQ243b Network QQ243a Network
QQ200
QQ201 Processor
QQ205 Input/Output Interface
QQ209 RF Interface
QQ211 Network Connection Interface
QQ213 Power Source
QQ202 Bus
QQ215 Memory
QQ217 RAM
QQ219 ROM
QQ221 Storage Medium
QQ223 Operating System
QQ225 Application Programs
QQ227 Data
QQ231 Communication Subsystem
QQ233 Transmitter
QQ235 Receiver

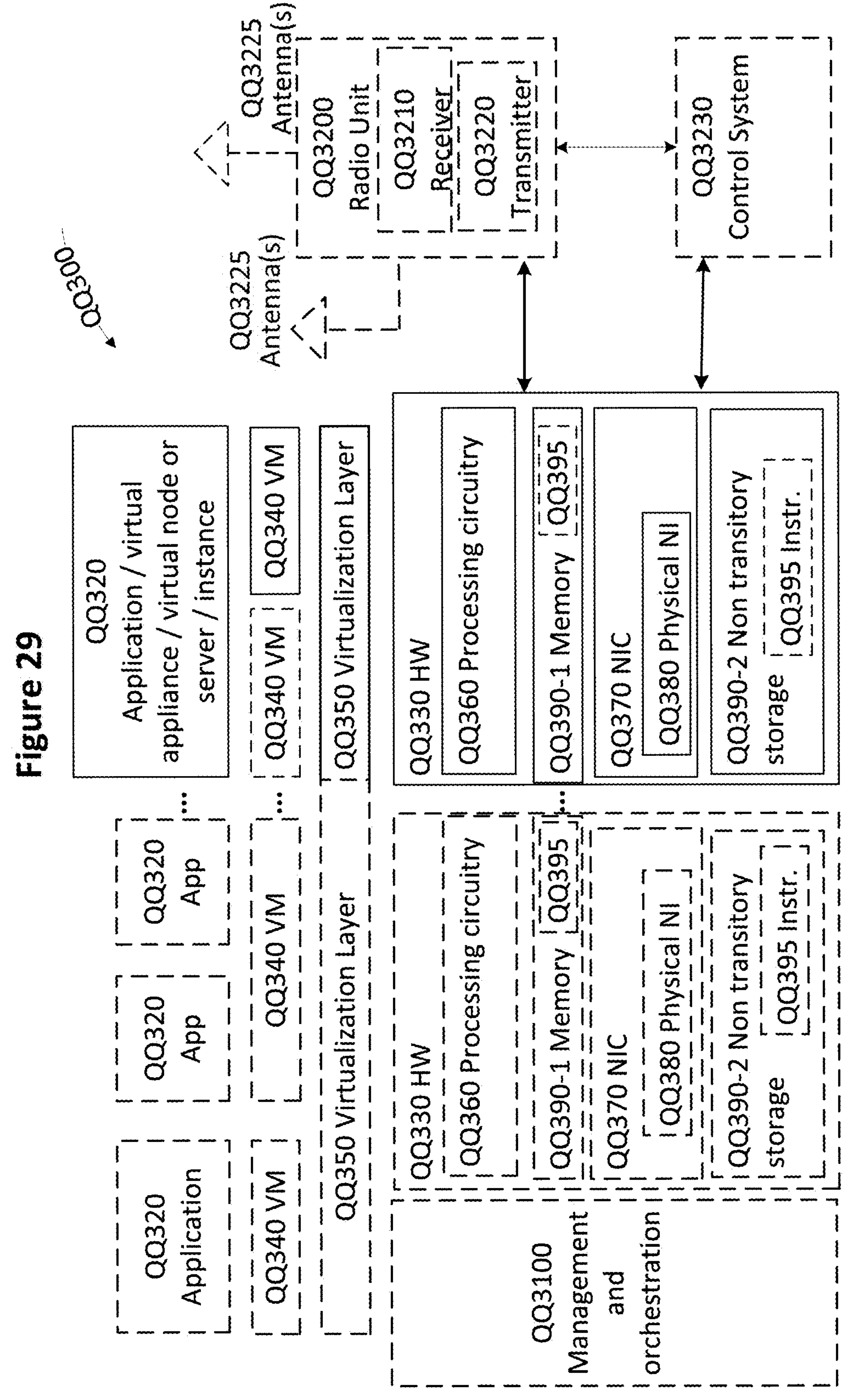
Figure 29
QQ300
QQ3225 Antenna(s)
QQ3225 Antenna(s)
QQ3200 Radio Unit
QQ3210 Receiver
QQ3220 Transmitter
QQ3230 Control System
QQ320 Application / virtual appliance / virtual node or server / instance
QQ340 VM
QQ340 VM
QQ350 Virtualization Layer
QQ330 HW
QQ360 Processing circuitry
QQ390-1 Memory
QQ395
QQ370 NIC
QQ380 Physical NI
QQ390-2 Non transitory storage
QQ395 Instr.
QQ320 App
QQ320 App
QQ320 Application
QQ340 VM
QQ340 VM
QQ350 Virtualization Layer
QQ330 HW
QQ360 Processing circuitry
QQ390-1 Memory
QQ395
QQ370 NIC
QQ380 Physical NI
QQ390-2 Non transitory storage
QQ395 Instr.
QQ3100 Management and orchestration

METHODS PROVIDING V2X APPLICATION SERVER REGISTRATION

CROSS REFERENCE TO RELATED APPLICATIONS

This application is a continuation of U.S. patent application Ser. No. 17/772,634 filed on Apr. 28, 2022, which is a 35 U.S.C. § 371 national stage application of PCT International Application No. PCT/EP2020/079376 filed on Oct. 19, 2020, which in turn claims priority to PCT International Application No. PCT/CN2019/115329 filed on Nov. 4, 2019, the disclosures and content of which are incorporated by reference herein in their entireties.

TECHNICAL FIELD

The present disclosure relates generally to communications, and more particularly to communication methods and related devices and nodes supporting wireless communications.

BACKGROUND

3GPP TS 23.286 (referred to as Reference [1] or [1]) defines V2X application layer model for V2X communications over PC5 and Uu. The model is illustrated in FIG. 1. The V2X application enabler (VAE) layer can provide support information to the V2X application.

The V2X UE1 can communicate with a V2X application server over a V1 reference point. The V2X UE1 and a V2X UE2 communicate over a V5 reference point. The V2X UE1 can also act as a UE-to-network relay, to enable V2X UE2 to access the V2X application server over a V1 reference point.

The V2X application layer functional entities for the V2X UE and the V2X application server can be grouped into the V2X application specific layer and the VAE layer. The VAE layer can offer the VAE capabilities to the V2X application specific layer. The V2X application layer functional model can use the SEAL services as specified in 3GPP TS 23.434 (referred to as Reference [2] of [2]).

The VAE server can be located in the VAE layer. The SEAL services used by VAE layer can be location management, group management, configuration management, identity management, key management and network resource management. The V2X application specific layer can include the V2X application specific functionalities.

The V2X application server can include the VAE server, the SEAL servers and the V2X application specific server. The VAE server can provide the V2X application layer support functions to the V2X application specific server over Vs reference point.

The V2X UEs can include the VAE client, the SEAL clients and the V2X application specific client. The VAE client provides the V2X application layer support functions to the V2X application specific client over Vc reference point. In some examples, the client and server entities of SEAL can be part of VAE client and VAE server respectively.

The VAE client can act as a VAL client for its interaction with the SEAL clients as specified in 3GPP TS 23.434 (Reference [2]). The VAE server can act as a VAL server for its interaction with the SEAL servers as specified in 3GPP TS 23.434 (Reference [2]).

In the VAE layer, the VAE client can communicate with the VAE server over a V1-AE reference point. In the V2X application specific layer, the V2X application specific client can communicate with V2X application specific server over V1-APP reference point.

In the VAE layer, the VAE client of V2X UE2 can communicate with VAE client of V2X UE1 over V5-AE reference point. In the V2X application specific layer, the V2X application specific client of V2X UE2 can communicate with VAE client of V2X UE1 over V5-APP reference point.

The following SEAL services for V2X applications are supported: location management as specified in 3GPP TS 23.434 [2]; group management as specified in 3GPP TS 23.434 [2]; configuration management as specified in 3GPP TS 23.434 [2]; identity management as specified in 3GPP TS 23.434 [2]; key management as specified in 3GPP TS 23.434 [2]; and network resource management as specified in 3GPP TS 23.434 [2].

The VAE client can interact with SEAL clients over the SEAL-C reference point specified for each SEAL service. The VAE server can interact with SEAL servers over the SEAL-S reference point specified for each SEAL service. The interaction between the SEAL clients can be supported by SEAL-PC5 reference point specified for each SEAL service. The interaction between a SEAL client and the corresponding SEAL server can be supported by SEAL-UU reference point specified for each SEAL service. The SEAL-C, SEAL-S, SEAL-PC5, SEAL-UU reference points for each SEAL service is specified in 3GPP TS 23.434 [2].

To support distributed VAE server deployments, the VAE server can interact with another VAE server over VAE-E reference point. V2X UE1 can also act as a UE-to-network relay, to enable VAE client on V2X UE2 to access VAE server over V1-AE reference point; and to enable V2X application specific client on V2X UE2 to access V2X application specific server over V1-APP reference point.

A V1-AE message can be sent over unicast, transparent multicast via xMB, transparent multicast via MB2. The non-transparent multicast via xMB can be triggered by a V1-AE message. Multicast distribution can be supported by both transparent and non-transparent multicast modes.

The VAE server can interact with the 3GPP network system over V2, MB2, xMB, Rx and T8 reference points. The EPS and 5GS (referred to as Reference [4] or [4]) can be considered as the 3GPP network system.

SUMMARY

In some embodiments, a method of operating a vehicle to anything, V2X, application enabler, VAE, server is provided. The method can include receiving a registration request message from a V2X application specific server. The method can further include transmitting a registration response message to the V2X application specific server responsive to receiving the registration request message.

In some other embodiments, a method of operating a vehicle to anything, V2X, application specific server is provided. The method can include transmitting a registration request message to a vehicle to anything, V2X, application enabler, VAE, server. The method can further include receiving a registration response message from the VAE server, wherein the registration response message is responsive to the registration request message.

Various embodiments herein describe service APIs and/or processes for V2X applications hosted at a V2X service provider (e.g. ITS road authority) that may be used to register with the VAE server for the purpose of sending and/or receiving V2X messages and/or network information/notifications.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 5 is a table illustrating an example of a V2X application-specific server registration request according to some embodiments of inventive concepts;

FIG. 6 is a table illustrating an example of a V2X application-specific server registration response according to some embodiments of inventive concepts;

FIG. 9 is a table illustrating an example of a V2X group message according to some embodiments of inventive concepts;

FIG. 12 is a table illustrating an example of a QoS sustainability analytics registration request according to some embodiments of inventive concepts;

FIG. 13 is a table illustrating an example of a QoS sustainability analytics registration response according to some embodiments of inventive concepts;

FIG. 15 is a table illustrating an example of a QoS change based on extended NG-RAN notification registration request according to some embodiments of inventive concepts;

FIG. 16 is a table illustrating an example of a QoS change based on extended NG-RAN notification registration response according to some embodiments of inventive concepts;

FIGS. 21-23 are flow charts illustrating examples of operations of a VAE server according to some embodiments of inventive concepts;

FIGS. 24-26 are flow charts illustrating examples of operations of a V2X application specific server according to some embodiments of inventive concepts;

FIG. 27 is a block diagram of a wireless network in accordance with some embodiments;

FIG. 29 is a block diagram of a virtualization environment in accordance with some embodiments;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 18:
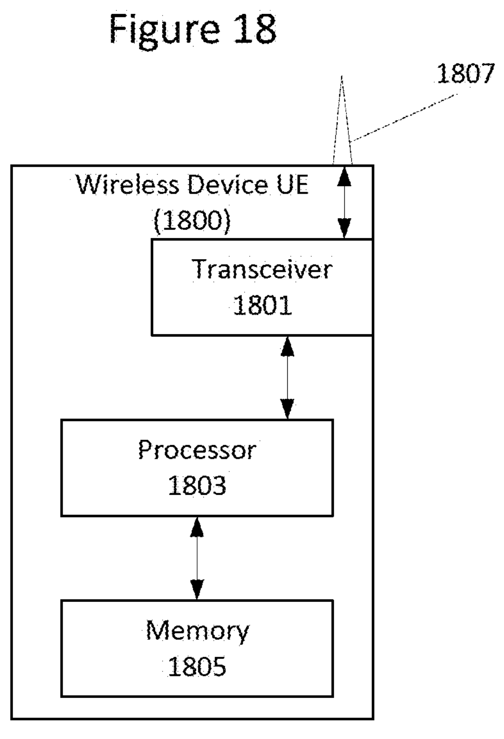
FIG. 18 is a block diagram illustrating a wireless device UE according to some embodiments of inventive concepts.

FIG. 18 is a block diagram illustrating elements of a wireless device UE 1800 (also referred to as a V2X UE, V2X UE device, mobile terminal, a mobile communication terminal, a wireless communication device, a wireless terminal, mobile device, a wireless communication terminal, user equipment, UE, a user equipment node/terminal/device, etc.) configured to provide wireless communication according to embodiments of inventive concepts. (Wireless device 1800 may be provided, for example, as discussed below with respect to wireless device QQ110 of FIG. 27.) As shown, wireless device UE may include an antenna 1807 (e.g., corresponding to antenna QQ111 of FIG. 27), and transceiver circuitry 1801 (also referred to as a transceiver, e.g., corresponding to interface QQ114 of FIG. 27) including a transmitter and a receiver configured to provide uplink and downlink radio communications with a base station(s) (e.g., corresponding to network node QQ160 of FIG. 27, also referred to as a RAN node) of a radio access network. Wireless device UE may also include processing circuitry 1803 (also referred to as a processor, e.g., corresponding to processing circuitry QQ120 of FIG. 27) coupled to the transceiver circuitry, and memory circuitry 1805 (also referred to as memory, e.g., corresponding to device readable medium QQ130 of FIG. 27) coupled to the processing circuitry. The memory circuitry 1805 may include computer readable program code that when executed by the processing circuitry 1803 causes the processing circuitry to perform operations according to embodiments disclosed herein. According to other embodiments, processing circuitry 1803 may be defined to include memory so that separate memory circuitry is not required. Wireless device UE may also include an interface (such as a user interface) coupled with processing circuitry 1803, and/or wireless device UE may be incorporated in a vehicle.

As discussed herein, operations of wireless device UE may be performed by processing circuitry 1803 and/or transceiver circuitry 1801. For example, processing circuitry 1803 may control transceiver circuitry 1801 to transmit communications through transceiver circuitry 1801 over a radio interface to a radio access network node (also referred to as a base station) and/or to receive communications through transceiver circuitry 1801 from a RAN node over a radio interface. Moreover, modules may be stored in memory circuitry 1805, and these modules may provide instructions so that when instructions of a module are executed by processing circuitry 1803, processing circuitry 1803 performs respective operations (e.g., operations discussed below with respect to Example Embodiments relating to wireless devices).

Figure 19:
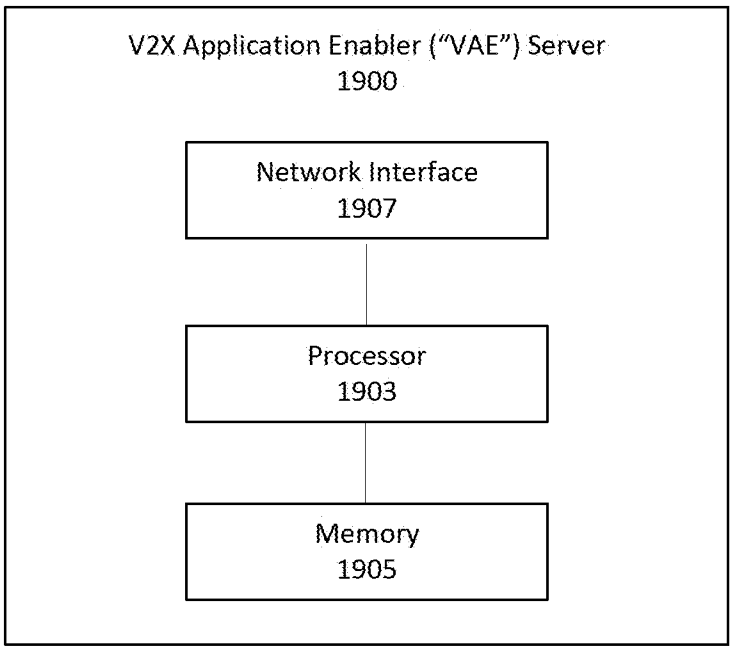
FIG. 19 is a block diagram illustrating a vehicle to anything, V2X, application enabler, VAE, server according to some embodiments of inventive concepts.

FIG. 19 is a block diagram illustrating elements of a vehicle to anything, V2X, application enabler, VAE, server 1900. The VAE server 1900 may include network interface circuitry 1907 (also referred to as a network interface configured to provide communications with other servers (e.g., with other VAE servers or with V2X application specific servers) and/or V2X UE devices (e.g., through a base station, also referred to as a Radio Access Network node or RAN node). The VAE server may also include processing circuitry 1903 (also referred to as a processor, e.g., corresponding to processing circuitry QQ170) coupled to the transceiver circuitry, and memory circuitry 1905 (also referred to as memory, e.g., corresponding to device readable medium QQ180 of FIG. 27) coupled to the processing circuitry. The memory circuitry 1905 may include computer readable program code that when executed by the processing circuitry 1903 causes the processing circuitry to perform operations according to embodiments disclosed herein. According to other embodiments, processing circuitry 1903 may be defined to include memory so that a separate memory circuitry is not required.

As discussed herein, operations of the VAE server may be performed by processing circuitry 1903 and/or network interface 1907. For example, processing circuitry 1903 may control network interface 1907 to transmit communications through network interface 1907 to one or more other servers/nodes and/or to receive communications through network interface from one or more other servers/nodes. Moreover, modules may be stored in memory 1905, and these modules may provide instructions so that when instructions of a module are executed by processing circuitry 1903, processing circuitry 1903 performs respective operations (e.g., operations discussed below with respect to Embodiments relating to VAE servers).

Figure 20:
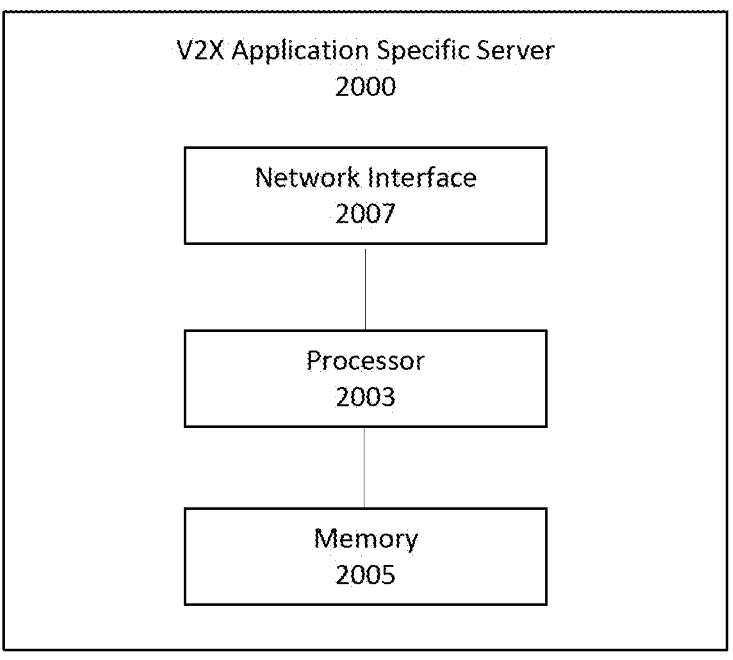
FIG. 20 is a block diagram illustrating a V2X application specific server according to some embodiments of inventive concepts.

FIG. 20 is a block diagram illustrating elements of a V2X application specific server according to embodiments of inventive concepts. As shown, the V2X application specific server may include network interface circuitry 2007 (also referred to as a network interface) configured to provide communications with other servers and/or V2X UE devices (e.g., through one or more VAE servers and/or RAN nodes). The V2X application specific server may also include processing circuitry 2003 (also referred to as a processor) coupled to the network interface circuitry, and memory circuitry 2005 (also referred to as memory) coupled to the processing circuitry. The memory circuitry 2005 may include computer readable program code that when executed by the processing circuitry 2003 causes the processing circuitry to perform operations according to embodiments disclosed herein. According to other embodiments, processing circuitry 2003 may be defined to include memory so that a separate memory circuitry is not required.

As discussed herein, operations of the V2X application specific server may be performed by processing circuitry 2003 and/or network interface circuitry 2007. For example, processing circuitry 2003 may control network interface circuitry 2007 to transmit communications through network interface circuitry 2007 to one or more other servers and/or to receive communications through network interface circuitry from one or more other servers. Moreover, modules may be stored in memory 2005, and these modules may provide instructions so that when instructions of a module are executed by processing circuitry 2003, processing circuitry 2003 performs respective operations (e.g., operations discussed below with respect to Example Embodiments relating to V2X application specific server).

Various embodiments described herein are related to V2X/ITS message delivery over long-range cellular communication (Uu) Uu. In particular, some embodiments describe how V2X application-specific servers, which may be owned by V2X service providers such as road authorities or car OEMs, using the V2X/ITS message delivery service can register to the network.

From a 3GPP architecture perspective, the VAE Server can be seen as an Application Function (AF) with respect to other network functions of 3GPP's core network. In this case, the VAE server receives network information/notifications as an AF interacting with core network functions, information/notification, which are then used for VAE server's functionalities. In some examples, a process for notification on potential QoS change to the V2X Application Server (TS 23.287, clause 6.4.1), which is based on the procedure for QoS Sustainability Analytics defined in TS 23.288, clause 6.9. The consumer of QoS Sustainability analytics may request the NWDAF analytics information regarding the QoS change statistics for an observation period in the past in a certain area or the likelihood of a QoS change for an observation period in the future in a certain area.

In additional or alternative examples, for QoS Change based on Extended NG-RAN Notification to support Alternative Service Requirements (TS 23.287, clause 5.4.5.3), which is based on the extended notification control mechanism of NG-RAN defined in TS 23.501, TS 23.502 and TS 23.503.

In both of the above examples, the notifications generated by NWDAF and NG-RAN are exposed (either directly or via NEF) to the AF, which can represent a VAE Server.

There may be a gap in terms of how V2X application-specific servers owned by V2X service providers can register to VAE servers (e.g., hosted by a mobile network operator) to send and receive V2X/ITS messages and network notification/information such as QoS notifications. A V2X service provider can refer to a generic provider that offers or has applications associated to V2X services, for instance a car's OEM, road authorities, providers such as map providers, VRU protection, lane merge. The current procedures in References [1] and [3] have addressed ITS/V2X message distribution from the VAE server. VAE servers discover V2X application servers and thus determine the consumers of the messages or notifications is not defined.

The message delivery API in [1] includes UL and DL message delivery. If the UL message delivery occurs before any DL message delivery, it is unclear how the VAE server discover the V2X application function. There is currently no mechanism defined to determine the V2X application-specific server.

Various embodiments herein describe APIs and procedures for V2X applications, more specifically V2X application-specific servers or clients to register to the VAE server or VAE client, respectively. A V2X service provider can use these APIs to interact with the 3GPP network system to send and receive V2X messages and network information/notification. V2X application-specific servers or clients can use these APIs to interact with mobile network.

In some embodiments, a standard mechanism is provided for V2X service providers or V2X application-specific servers to interact with the VAE server, which can be hosted by a mobile network operator.

In some embodiments, a V2X service provider may be described as the entity attempting to register to a VAE client/server. A V2X service provider can refer to a generic provider that offers or has applications associated to V2X services. Examples of V2X service providers can include a car's OEM, OEM's tiers, ITS road authorities, generic providers for services such as map providers, VRU protection, lane merge. A V2X application server can refer to a server side of the V2X service provider (e.g., backends of a car's OEM, OEM's tiers, ITS road authorities, generic providers). A V2X UE can refer to a device side of the V2X service provider (e.g., vehicles, road infrastructures).

In some embodiments, a network information/notification refers to information exposed by the mobile network or notifications generated by the mobile network that can be relevant to the V2X services under consideration. Examples of such information/notification can be an Extended NG-RAN Notification (generated by NG-RAN and exposed by core network to AF to notify about un-fulfilment/re-fulfilment of QoS and, in case of un-fulfilment, including information about Alternation QoS Profile that can be currently fulfilled) or Notification on QoS Sustainability Analytics (generated by NWDAF and exposed to AF to notify about predicted changes of QoS capabilities over a certain path).

Service APIs to V2X applications are discussed below.

Figures 2, 3:
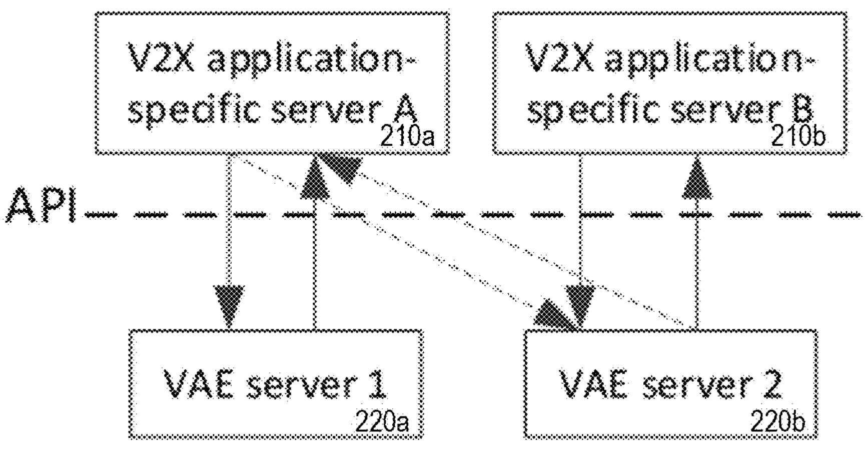
FIG. 2 is a block diagram illustrating an example of APIs between a V2X application-specific server and a VAE server at V2X application server according to some embodiments of inventive concepts.
FIG. 3 is a block diagram illustrating an example of APIs between a V2X application-specific client and a VAE client at V2X UE according to some embodiments of inventive concepts.

In some embodiments, service APIs can offer packages or services to consumers. For example, a V2X service provider may need to establish a relation to the VAE to access the services offered by VAE such as sending and receiving V2X messages or receiving network information/notification that are associated to V2X services. The V2X application, more specifically a V2X application-specific server or client that in this context is the consumer of services offered by VAE and of relevant information. FIGS. 2-3 describe an API interface at the V2X application server and V2X UE, respectively. Service APIs may be required for both downlink and uplink.

FIG. 2 is a block diagram illustrating an example of APIs between V2X application-specific server and VAE server at V2X Application server. A V2X message generated at a V2X application-specific server 210*a-b* can use service APIs to provide the message to a VAE server 220*a-b*. A V2X message received at a VAE server 220*a-b* can use service APIs to provide the message to a V2X application-specific server 210*a-b*. Information/notification generated from the 3GPP network system can be received at the VAE server 220*a-b* that uses service-APIs to provide to the V2X application-specific server 210*a-b*.

FIG. 3 is a block diagram illustrating an example of APIs between V2X application-specific client and VAE client at V2X UE. A V2X message received at a VAE client 320*a-b* can use service APIs to provide the message to a V2X application-specific client 310*a-b*. A V2X message generated at a V2X application-specific client 310*a-b* can use service APIs to provide the message to a VAE client 320*a-b*. Information/notification received at the VAE client 320*a-b* that use service APIs to provide such information/notification to the V2X application-specific client 310*a-b*.

A relationship between a V2X application-specific server and a VAE server can be M-N. A V2X application-specific server can be owned by a V2X service provider. A VAE server can be either owned by a V2X service provider or by a mobile network operator. The V2X application specific-server can use one or more VAE servers to reach the V2X UEs. A VAE server can handle data associated with one or more V2X application-specific servers. The V2X application-specific server (e.g., a client) may register to multiple VAE servers (e.g., clients).

Service APIs described can be generalized for other VAL systems.

A V2X service provider can establish a link to the mobile network operator (e.g., a hosting VAE server) using service APIs. In some examples, the mobile network operator may also want to establish a link to a V2X service providers, and the same APIs can be used.

The APIs can be offered as deployment option, e.g., through a network slice. APIs and Use-cases will be discussed below.

V2X services providers (e.g. car OEMs, Road Traffic Authorities, and other 3rd party service providers) can be customers of V2X communication services provided by mobile networks. V2X applications can be implemented using both a V2X application-specific server and a V2X application-specific client. The VAE server can provide a standardized way of providing such V2X communication services to the customers.

The following APIs for interaction between the application-specific server and VAE server as well as application-specific client and VAE client may be needed:

VAE_V2X_Message_Delivery_Server and VAE_V2X_Message_Delivery_Client. These interfaces can refer to Vs and Vc interfaces in the application layer functional model in FIG. 1, respectively.

A consumer of a VAE_V2X_Message_Delivery_Server can include a V2X application specific server. Operations of the VAE_V2X_Message_Delivery_Server can include:

- V2X_Application_Specific_Server_Registration (Request/Response);
- V2X_Downlink_Message_Delivery_TX (Request/Response);
- V2X_Uplink_Message_Delivery_RX (Subscribe/Notify); and
- V2X_Network_Information_QoS_Notification (Subscribe/Notify).

A V2X_Application_Specific_Server_Registration (Request/Response) can be used in some embodiments (e.g., V2X_MessageDelivery_Register) for application-specific server registration for uplink/downlink message delivery and QoS notifications.

A V2X_Downlink_Message_Delivery_TX (Request/Response) can be defined in 3GPP TS 23.286 [1] clause 10.2.2.2 as V2X_Message_Delivery [1], and can be used in some embodiments to provide message delivery status report to the V2X application-specific server for both downlink messages and group messages.

A V2X_Uplink_Message_Delivery_RX (Subscribe/Notify) can be defined in 3GPP TS 23.286 [1] clause 10.2.2.3 as V2X_Uplink_Message_Delivery [1], and can be used in some embodiments to provide uplink reception report from the V2X application-specific server for uplink messages.

A consumer of a VAE_V2X_Message_Delivery_Client can include a V2X application specific client. Operations of a VAE_V2X_Message_Delivery_Client can include:

- V2X_Application_Specific_Client_Registration (Request/Response);
- V2X_Uplink_Message_Delivery_TX (Request/Response);
- V2X_Downlink_Message_Delivery_RX (Subscribe/Notify); and
- V2X_Network_Information_QoS_Notification (Subscribe/Notify).

Standardized APIs of VAE for both V2X application-specific server and V2X application-specific client can allow the deployment of V2X services over cellular networks in an interoperable way (e.g., cross-MNO and cross-V2X-service-provider). The relationship can be more than one to more than one between V2X application specific server (owned by V2X service providers) and the VAE server, when implemented in a PLMN domain in a distributed manner (see 3GPP TS 23.286 [1] clause 7.2). The relationship between V2X application specific client (owned also by V2X service providers) and the VAE client can be multiple to one.

Figure 4:
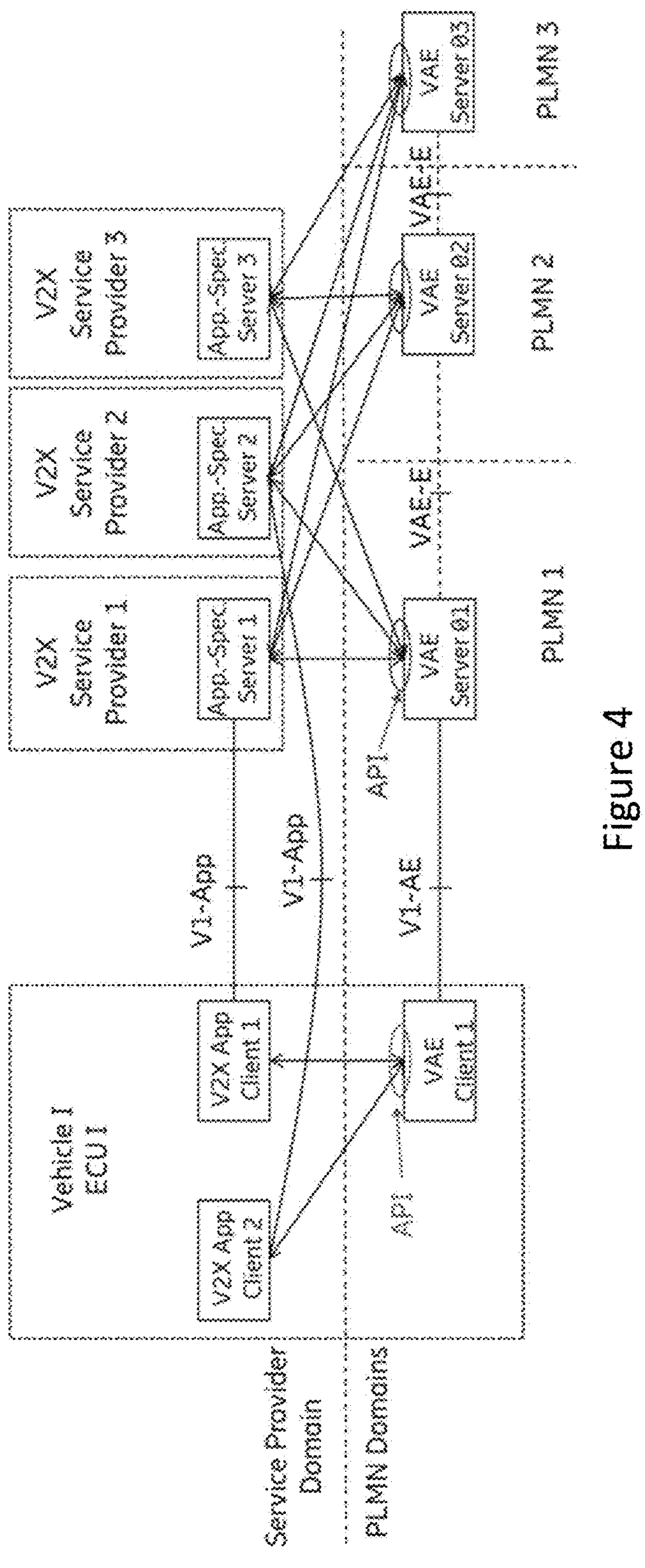
FIG. 4 is a block diagram illustrating an example of APIs between V2X service providers and PLMNs according to some embodiments of inventive concepts.

FIG. 4 is a block diagram illustrating and example of APIs between V2X service providers and PLMNs.

In additional to registration and (up-link/down-link) message delivery, special features that may be required by V2X services, (e.g., QoS and Pre-QoS notification) can be considered in the APIs.

V2X application-specific server registration will be discussed below including a process for V2X application-specific server to register to the VAE server to send and receive messages.

FIG. 5 is a table illustrating an example of an information flow V2X application-specific server registration request from the V2X application-specific server to the VAE server.

FIG. 6 is a table illustrating an example of an information flow V2X application-specific server registration response from the VAE server to the V2X application-specific server.

Figure 7:
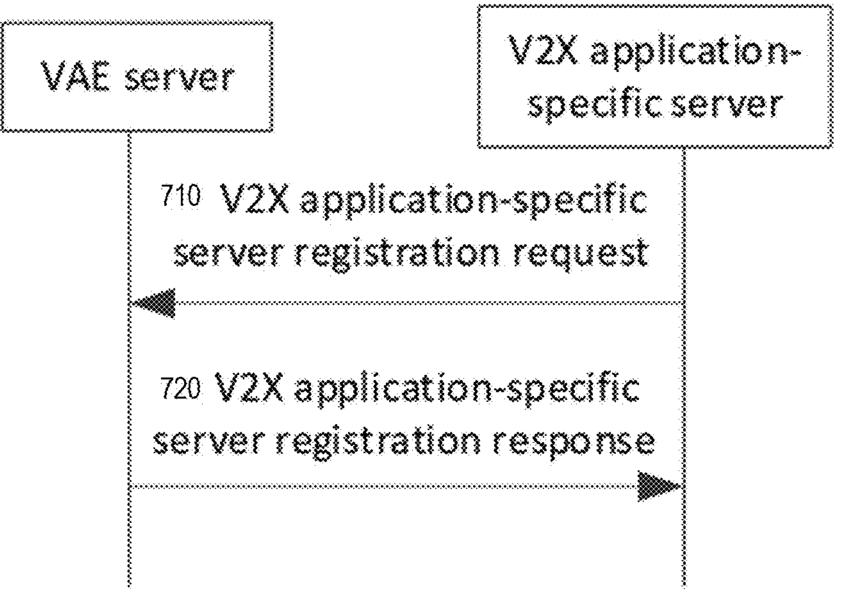
FIG. 7 is a signal flow diagram illustrating an example of a process for V2X application-specific server registering to the VAE server according to some embodiments of inventive concepts.

FIG. 7 is a signal flow diagram illustrating an example of a process for V2X application-specific server registering to the VAE server. The V2X application-specific server can belong to a V2X service provider which has a business relationship with the VAE. The V2X application-specific server can be aware of the address of the VAE server and is authorized to communicate with the VAE server. In operation 710, the V2X application-specific server sends a registration request to the VAE server to register to receive uplink messages. The V2X application-specific service can subscribe to receive certain V2X messages based on their V2X service ID and GEO ID. In operation 720, the VAE server sends a registration response to the V2X application-specific server indicating success or failure.

Figure 8:
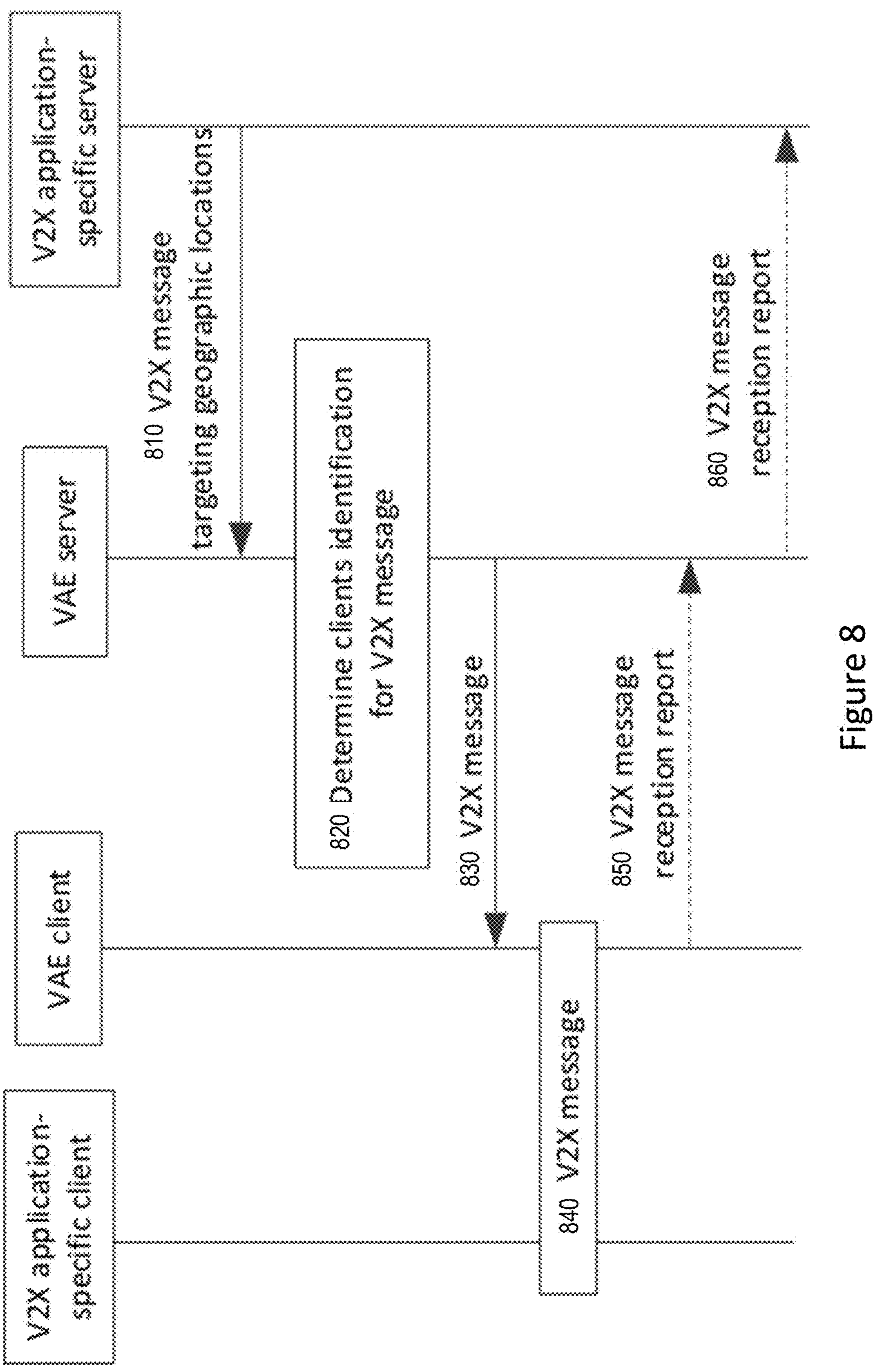
FIG. 8 is a signal flow diagram illustrating an example of a process for delivering messages to target geographical areas from the VAE server according to some embodiments of inventive concepts.

FIG. 8 is a signal flow diagram illustrating an example of a process for delivering messages to target geographical areas from the VAE server. The VAE clients may have registered with the VAE server as described in subclause 9.2.3 of 3GPP TS 23.286 [1]. One or more VAE clients may have subscribed to geographical area GEO ID. The VAE server may have created a mapping between geographical area information and client identification as described in subclause 9.3.3 of 3GPP TS 23.286 [1]. The V2X application-specific server may have registered with the VAE server as described with respect to FIG. 7 of the present disclosure In operation 810, the application-specific server sends a V2X message of a service with V2X Service ID (e.g. ETSI ITS DENM, ETSI ITS CAM) with target geographical area GEO ID. In operation 820, the VAE server retrieves the list of registered and subscribed clients for the V2X message targeting geographical area GEO ID and determines the clients' identification V2X UE ID. In operation 830, the VAE server transmits the message to each VAE client using the client identification. In operation 840, the VAE client provides the V2X message to the application-specific client. In operation 850, the VAE client provides a V2X message reception report to the VAE server if indicated in the V2X message. In operation 860, the VAE server may provide a V2X message reception report to the V2X application-specific server.

The following will discuss V2X group message.

FIG. 9 is a table illustrating an example of an information flow for a VAE server to deliver a V2X message to a group of VAE clients.

Figure 10:
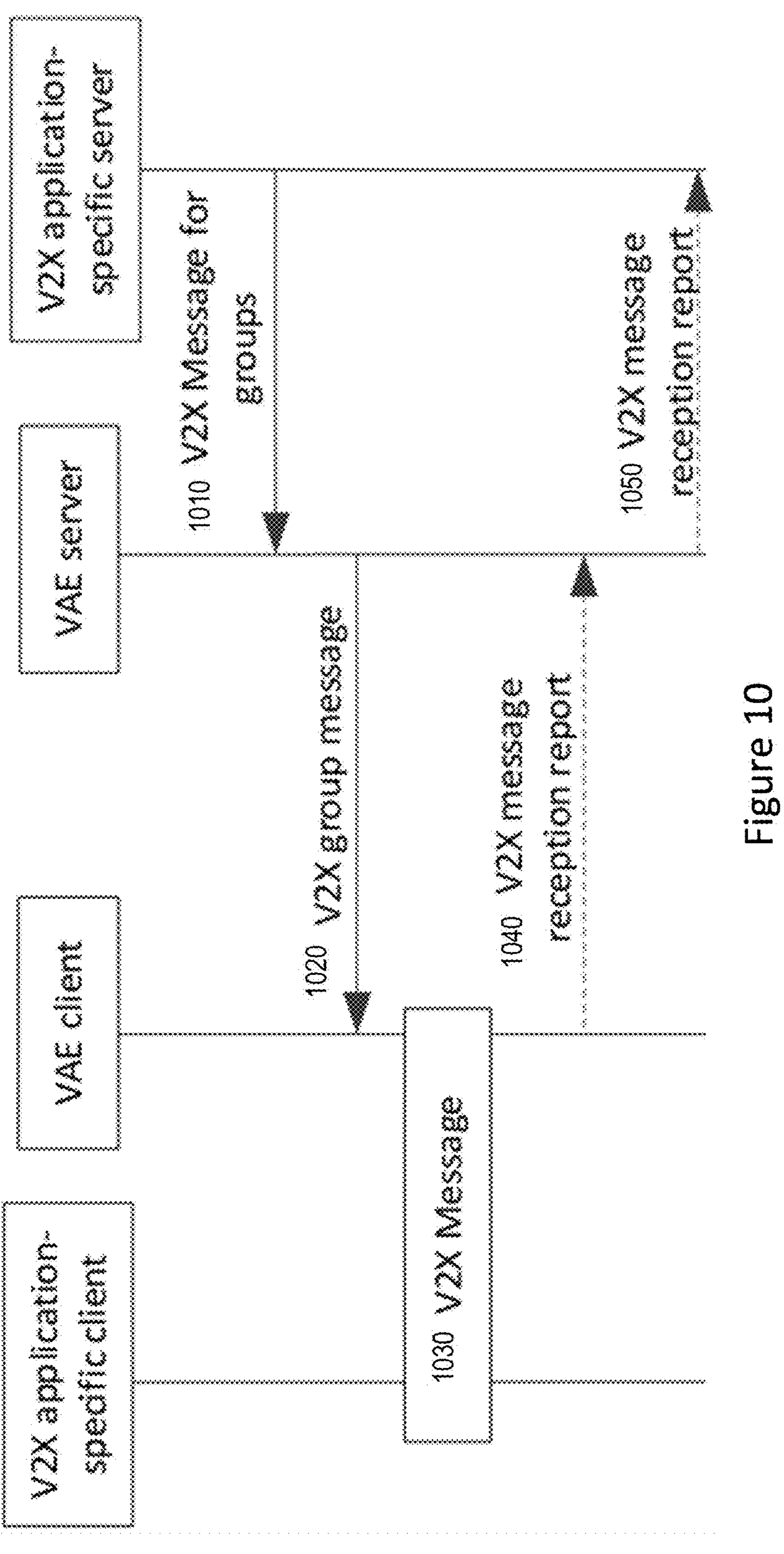
FIG. 10 is a signal flow diagram of a process for delivering V2X group messages to VAE clients according to some embodiments of inventive concepts.

FIG. 10 is a signal flow diagram illustrating an example of a process for delivering V2X group messages to VAE clients. The VAE client may have registered to receive V2X group messages as described in in subclause 10.3.8 of 3GPP TS 23.434 [2]. The V2X application-specific server may have registered with the VAE server as described with respect to FIG. 7 of the present disclosure.

In operation 1010, the V2X application-specific server provides a V2X message for distribution to V2X group with V2X Group ID. In operation 1020, the VAE server delivers the V2X message to all registered VAE clients with V2X Group ID. In operation 1030, the VAE client provides the V2X message to the V2X application-specific client. In operation 1040, the VAE client may provide a V2X message reception report to the VAE server. In operation 1050, the VAE server may provide a V2X message reception report to the V2X application-specific server.

Figure 11:
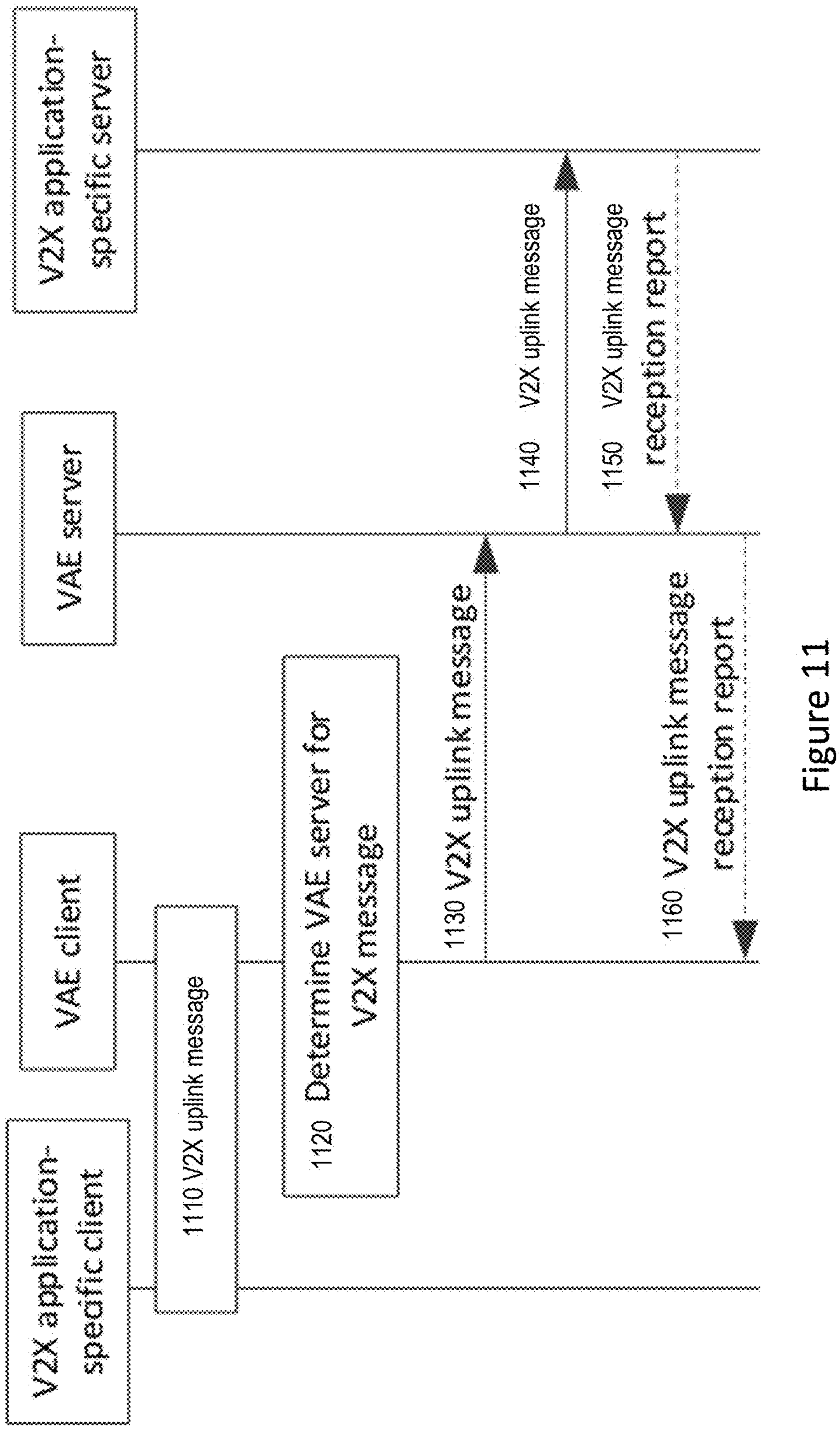
FIG. 11 is a signal flow diagram of a process for delivering messages from V2X UE to the V2X application server according to some embodiments of inventive concepts.

FIG. 11 is a signal flow diagram illustrating an example of a process for delivering messages from V2X UE to the V2X application server. The VAE client may have discovered the VAE server as described in subclause 9.1.2 of 3GPP TS 23.286 [1]. The VAE client may have registered to a V2X service identified by a V2X Service ID as described in subclause 9.2 of 3GPP TS 23.286 [1]. The V2X application-specific server may have registered with the VAE server as described with respect to FIG. 7 of the present disclosure.

In operation 1110, the V2X application-specific client sends a V2X uplink message to the VAE client. In operation 1120, the VAE client determines the VAE server for receiving the V2X uplink message with V2X Service ID. In operation 1130, the VAE client transmits the V2X uplink message to the VAE server. In operation 1140, the VAE server provides the V2X uplink message to the application-specific server. In operation 1150, the V2X application-specific server may provide a V2X uplink message reception report to the VAE server if indicated in the V2X uplink message. In operation 1160, the VAE server may provide a V2X uplink message reception report to the VAE client if indicated in the V2X uplink message.

In some embodiments, an API enables the V2X application specific server to register to the VAE server and communicate with the VAE server to send and receive V2X messages to and from the V2X UEs (including V2X groups). The following describes V2X_MessageDelivery_Register operation.

API operation name: V2X_MessageDelivery_Register

Description: Register to the VAE server for sending and receiving V2X messages.

Known Consumers: V2X application specific server.

Inputs: Refer to FIG. 5 of the present disclosure

Outputs: Success or Failure.

See FIG. 7 of the present disclosure for details of usage of this API operation.

The following describes the procedure for a V2X application-specific server to register to the VAE server to receive notification on QoS Sustainability Analytics. This notification provides information about QoS change statistics for an observation period in the past in a certain area or the likelihood of a QoS change for an observation period in the future in a certain area.

FIG. 12 is a table illustrating an example of an information flow for QoS Sustainability Analytics registration request from the V2X application-specific server to the VAE server.

FIG. 13 is a table illustrating an example of an information flow for QoS Sustainability Analytics registration response from the VAE server to the V2X application-specific server.

Figure 14:
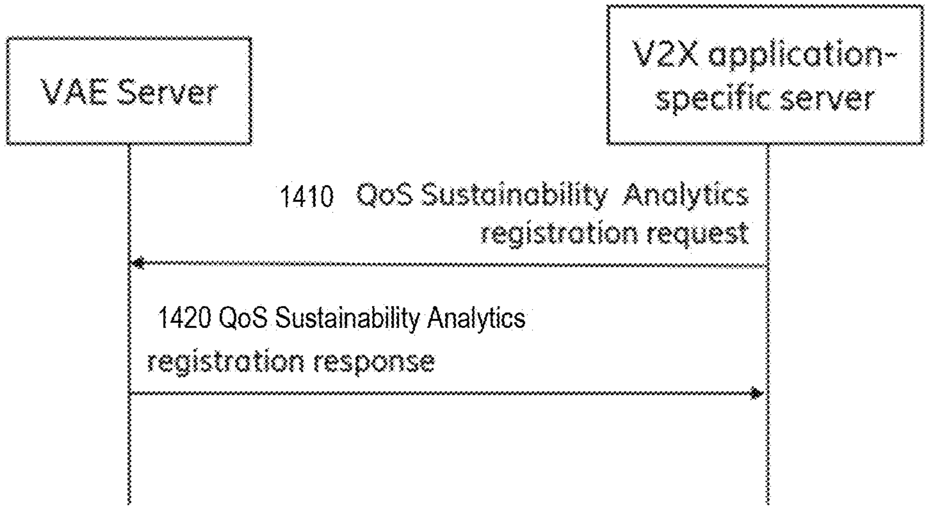
FIG. 14 is a signal flow diagram of a process for QoS sustainability analytics registration to the VAE server according to some embodiments of inventive concepts.

FIG. 14 is a signal flow diagram illustrating an example of a process for QoS Sustainability Analytics registration to the VAE server. The V2X application-specific server may belong to a V2X service provider which has a business relationship with the VAE. The V2X application-specific server may be aware of the address of the VAE server and is authorized to communicate with the VAE server.

In operation 1410, the V2X application-specific server sends a registration request to the VAE server to register to receive QoS Sustainability Analytics notifications. The V2X application-specific service can subscribe to receive certain QoS Sustainability Analytics notifications based on Analytics Filter Information included in the request. In operation 1420, the VAE server sends a registration response to the V2X application-specific server indicating success or failure.

The following describes a process for V2X application-specific server to register to the VAE server to receive notification on QoS change based on Extended NG-RAN Notification. This notification provides information about the capability of NG-RAN to fulfil (or re-fulfill) a certain QoS Flow together with information about which of the Alternative Service Requirements associated to the QoS Flow are currently expected to be achievable by NG-RAN.

FIG. 15 is a table illustrating an example of an information flow for QoS change based on Extended NG-RAN Notification registration request from the V2X application-specific server to the VAE server.

FIG. 16 is a table illustrating an example of an information flow for QoS change based on Extended NG-RAN Notification registration response from the VAE server to the V2X application-specific server.

Figure 17:
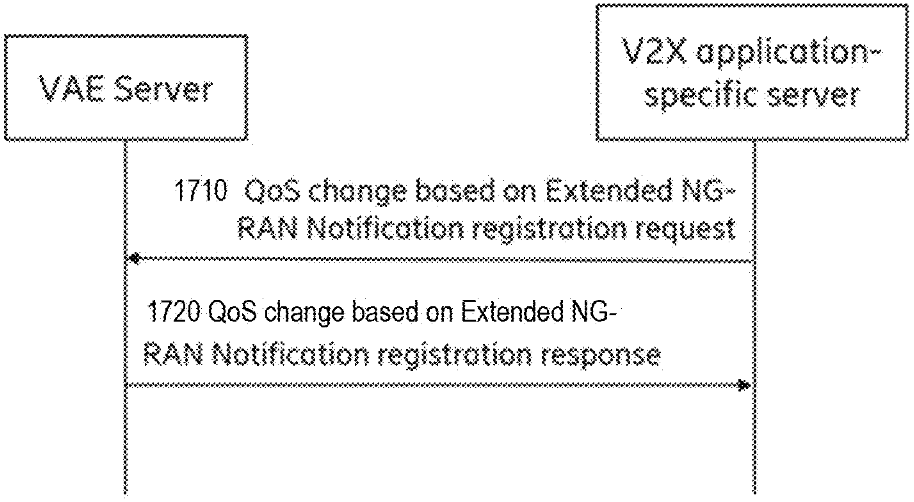
FIG. 17 is a signal flow diagram illustrating an example of a process for QoS change based on extended NG-RAN notification registration on the VAE server according to some embodiments of inventive concepts.

FIG. 17 is a signal flow diagram illustrating an example of a process for QoS change based on Extended NG-RAN Notification registration to the VAE server. The V2X application-specific server may belong to a V2X service provider which has a business relationship with the VAE. The V2X application-specific server may be aware of the address of the VAE server and is authorized to communicate with the VAE server. In operation 1710, the V2X application-specific server sends a registration request to the VAE server to register to receive QoS change based on Extended NG-RAN Notification. The V2X application-specific service can subscribe to receive certain QoS change based on Extended NG-RAN Notifications based on GEO ID and Alternative Service Requirements included in the request. In operation 1720, the VAE server sends a registration response to the V2X application-specific server indicating success or failure.

Service APIs and procedures for V2X applications hosted at a V2X service provider e.g. ITS road authority to register with the VAE server for the purpose of sending and receiving V2X messages and network information/notifications.

Operations of a VAE server 1900 (implemented using the structure of FIG. 19) will now be discussed with reference to the flow charts of FIGS. 21-23 according to some embodiments of inventive concepts. For example, modules may be stored in memory 1905 of FIG. 19, and these modules may provide instructions so that when the instructions of a module are executed by respective VAE server processing circuitry 1903, processing circuitry 1903 performs respective operations of the flow charts.

At block 2110, processing circuitry 1903 receives, via network interface 1907, a registration request message from a V2X application specific server, as discussed above, for example, with respect to message/operation 710 of FIG. 7.

At block 2120, processing circuitry 1903 transmits, via network interface 1907, a registration response message to the V2X application specific server, as discussed above, for example, with respect to message/operation 720 of FIG. 7. The registration response message can include an indication of a result of registration responsive to the registration request message. The indication of the result can indicate one of success or failure of registration responsive to the registration request message, as discussed above, for example, with respect to FIG. 6.

In some embodiments, the registration request message is received using a service application programming interface, API, and the registration response message is transmitted using the service API.

In additional or alternative embodiments, the registration request message may be a V2X application specific server registration request message (e.g., see operation/message 710 of FIG. 7), and the registration response message may be a V2X application specific server registration response message (e.g., see operation/message 720 of FIG. 7). In some examples (e.g., as shown in FIG. 5), the V2X application specific server registration request message can include at least one of an identifier of the V2X application specific server that is used to communicate uplink messages, a V2X service identifier to which the V2X application specific server registers, an identifier of a geographical area to which the V2X application specific server registers, and/or information of the V2X application specific server used to receive notifications. In additional or alternative examples, the V2X application specific server registration request message includes at least one of a V2X service identifier to which the V2X application specific server registers and/or an identifier of a geographical area to which the V2X application specific server registers. The V2X application specific server registration request message can include a request to register to receive uplink messages at the V2X application specific server from the VAE server based on the at least one of the V2X service identifier and/or the identifier of the geographical area.

Figure 22:
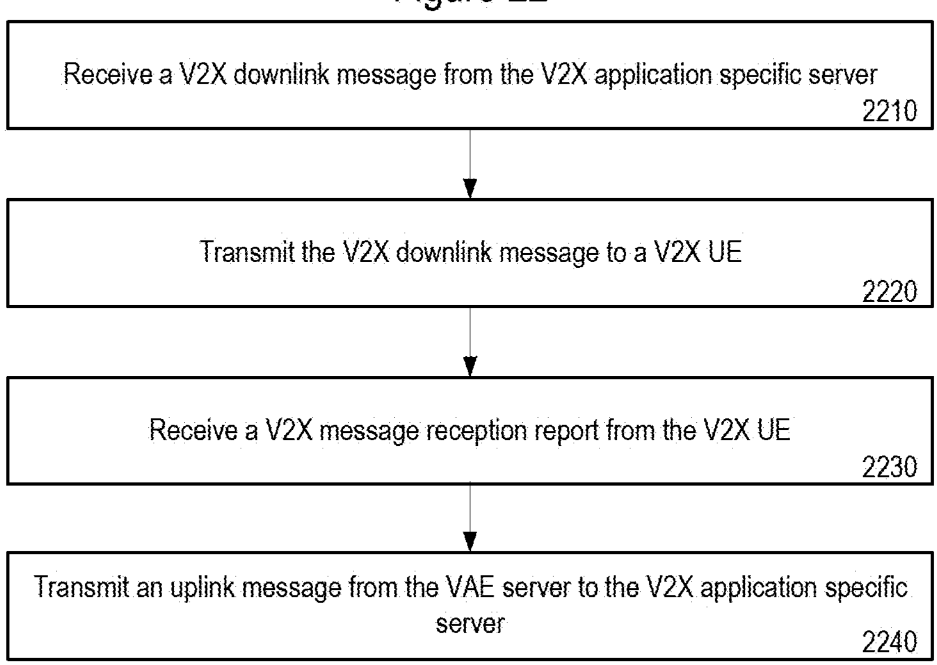

In FIG. 22, at block 2210, processing circuitry 1903 receives, via network interface 1907, a V2X downlink message from the V2X application specific server (e.g., after transmitting the V2X application specific server registration response message of block 2120), as discussed above, for example, with respect to operation/message 810 of FIG. 8.

At block 2220, processing circuitry 1903 transmits, via network interface 1907, the V2X downlink message to a V2X UE device (responsive to receiving the V2X downlink message of block 2210), as discussed above, for example, with respect to operation/message 830 of FIG. 8. The V2X downlink message may be transmitted to the V2X UE through a Radio Access Network (RAN) node (also referred to as a base station). Moreover, the V2X UE device may also be referred to as a V2X UE and/or a VAE client.

At block 2230, processing circuitry 1903 receives, via network interface 1907, a V2X message reception report from the V2X UE (after transmitting the V2X downlink message), as discussed above, for example, with respect to operation/message 850 of FIG. 8. The V2X message reception report of block 2230 can correspond to the V2X downlink message.

At block 2240, processing circuitry 1903 transmits, via network interface 1907, an uplink message (e.g., the V2X message reception report) from the VAE server to the V2X application specific server, as discussed above, for example, with respect to operation/message 860 of FIG. 8.

In some embodiments, the V2X downlink message is associated with at least one of the V2X service identifier and/or the identifier of the geographical area. Transmitting the V2X downlink message can include transmitting the V2X downlink message to the V2X UE device based on the at least one of the V2X service identifier and/or the identifier of the geographical area associated with the V2X downlink message. The V2X message reception report can be transmitted to the V2X application specific server based on the at least one of the V2X service identifier and/or the identifier of the geographical area associated with the V2X downlink message.

In additional or alternative embodiments, the V2X downlink message can include a downlink V2X group message to be distributed to a plurality of V2X UE devices based on a V2X group identifier included in the downlink V2X group message. Transmitting the downlink V2X group message can include transmitting the downlink V2X group message to the plurality of V2X UE devices.

In FIG. 23, at block 2310, processing circuitry 1903 receives, via network interface 1907, a V2X uplink message from a V2X UE device (also referred to as a V2X UE or a VAE client), as discussed above, for example, with respect to message/operation 1130 of FIG. 11.

At block 2320, processing circuitry 1903 transmits, via network interface 1907, the V2X uplink message from the VAE server to the V2X application specific server based on the at least one of the V2X service identifier and/or the identifier of the geographical area responsive to receiving the V2X uplink message from the V2X UE device, as discussed above, for example, with respect to message/operation 1140 of FIG. 11.

At block 2330, processing circuitry 1903 receives, via network interface 1907, a V2X uplink message reception report from the V2X application specific server, as discussed above, for example, with respect to operation/message 1150 of FIG. 11. The V2X uplink message reception report can be associated with the V2X uplink message.

At block 2340, processing circuitry 1903 transmits, via network interface 1907, the V2X uplink message transmission report to the V2X UE device based on the at least one of the V2X service identifier and/or the identifier of the geographical area, as discussed above, for example, with respect to operation 1160 of FIG. 11.

In some embodiments, the registration request message includes a Quality of Service, QoS, registration request message, and the registration response message includes a QoS registration response message. In additional or alternative embodiments, the QoS registration request message includes a QoS sustainability analytics registration request message, and the QoS registration response message includes a QoS sustainability analytics registration response message. In additional or alternative embodiments (e.g., as shown in FIG. 12), the QoS sustainability analytics registration request message includes at least one of an identifier of the V2X application specific server, an indication whether QoS sustainability analytics notifications should be provided to a VAE client device, a V2X service identifier to which the V2X application specific server registers, an identifier of a geographical area to which the V2X application specific server registers, information of the V2X application specific server to receive QoS sustainability analytics notifications, and/or analytics filter information.

In additional or alternative embodiments, processing circuitry 1903 communicates, via network interface 1907, QoS sustainability analytics information between the VAE server and the V2X application specific server based on information from the QoS registration request message.

In additional or alternative embodiments, the QoS registration request message includes a QoS change based on extended next generation radio access network, NG-RAN, notification registration request message, and the QoS registration response message includes a QoS change based on extended NG-RAN notification registration response message. In additional or alternative embodiments (e.g., as shown in FIG. 15), the QoS change based on extended NG-RAN notification registration request message can include at least one of an identifier of the V2X application specific server, an indication whether QoS change based on extended NG-RAN notification should be provided to a VAE client device, a V2X service identifier to which the V2X application specific server registers, an identifier of a geographical area to which the V2X application specific server registers, information of the V2X application specific server to receive QoS change based on extended NG-RAN notification, and/or alternative service requirements.

In additional or alternative embodiments, processing circuitry 1903 communicates, via network interface 1907, QoS change based on extended NG-RAN notification between the VAE server and the V2X application specific server based on information from the QoS registration request message.

In additional or alternative embodiments, processing circuitry 1903 communicates, via network interface 1907, a QoS communication between the VAE server and the V2X application specific server based on information from the QoS registration request message.

Figure 21:
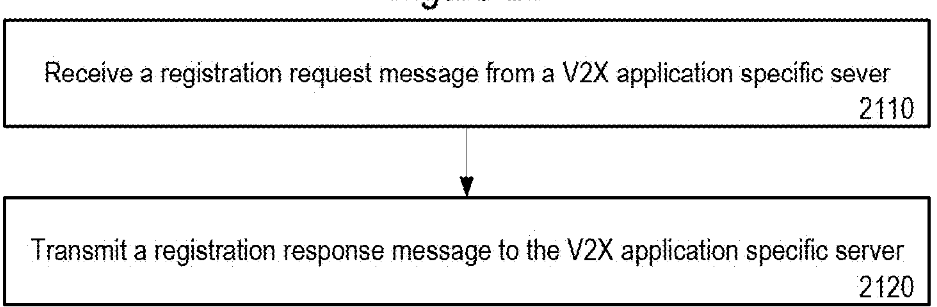

Various operations from the flow charts of FIGS. 21-23 may be optional with respect to some embodiments of VAE servers and related methods. Regarding methods of Embodiment 1 (set forth below), for example, operations of blocks 2210, 2220, 2230, and 2240 of FIG. 22 and blocks 2310, 2320, 2340, and 2350 of FIG. 23 may be optional.

Operations of a V2X application specific server 2000 (implemented using the structure of FIG. 20) will now be discussed with reference to the flow charts of FIGS. 24-26 according to some embodiments of inventive concepts. For example, modules may be stored in memory 2005 of FIG. 20, and these modules may provide instructions so that when the instructions of a module are executed by respective V2X application specific server processing circuitry 2003, processing circuitry 2003 performs respective operations of the flow charts.

At block 2410, processing circuitry 2003 transmits, via network interface 2007, a registration request message to a V2X, application enabler, VAE, server, as discussed above, for example, with respect to operation/message 710 of FIG. 7.

At block 2420, processing circuitry 2003 receives, via network interface 2007, a registration response message from the VAE server, wherein the registration response message is responsive to the registration request message, as discussed above, for example, with respect to operation/message 720 of FIG. 7. The registration response message can include an indication of a result of registration responsive to the registration request message. The indication of the result can indicate one of success or failure of registration responsive to the registration request message.

In some embodiments, the registration request message is transmitted using a service application programming interface, API, and the registration response message is received using the service API. In additional or alternative embodiments, the registration request message may be a V2X application specific server registration request message (e.g., see operation/message 710 of FIG. 7), and the registration response message may be a V2X application specific server registration response message (e.g., see operation/message 720 of FIG. 7). In some examples (e.g., as shown in FIG. 5), the V2X application specific server registration request message can include at least one of an identifier of the V2X application specific server that is used to communicate uplink messages, a V2X service identifier to which the V2X application specific server registers, an identifier of a geographical area to which the V2X application specific server registers, and/or information of the V2X application specific server used to receive notifications.

In additional or alternative embodiments, the V2X application specific server registration request message includes at least one of a V2X service identifier to which the V2X application specific server registers and/or an identifier of a geographical area to which the V2X application specific server registers. The V2X application specific server registration request message can include a request to register to receive uplink messages at the V2X application specific server from the VAE server based on the at least one of the V2X service identifier and/or the identifier of the geographical area.

In FIG. 25, at block 2510, processing circuitry 2003 transmits, via network interface 2007, a V2X downlink message from the V2X application specific server (e.g., after receiving the V2X application specific server registration response message), as discussed above, for example, with respect to operation/message 810 of FIG. 8.

At block 2520, processing circuitry 2003 receives, via network interface 2007, an uplink message from the VAE server based on the at least one of the V2X service identifier and/or the identifier of the geographical area, as discussed above, for example, with respect to operation/message 860 of FIG. 8. In some embodiments, the V2X message reception report corresponds to the V2X downlink message. The V2X downlink message can be associated with at least one of the V2X service identifier and/or the identifier of the geographical area, and the V2X message reception report can be received from the VAE server based on the at least one of the V2X service identifier and/or the identifier of the geographical area associated with the V2X downlink message. In additional or alternative embodiments, the V2X downlink message includes a downlink V2X group message to be distributed to a plurality of V2X UE devices based on a V2X group identifier included in the downlink V2X group message.

Figure 26:
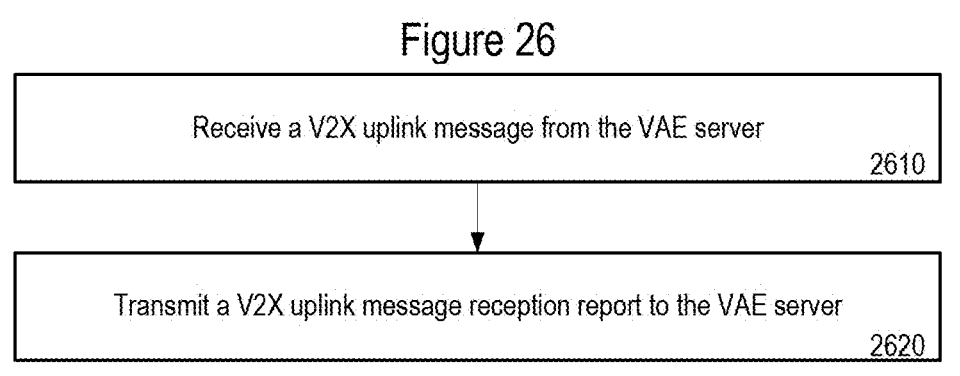

In FIG. 26, at block 2610, processing circuitry 2003 receives, via network interface 2007, a V2X uplink message from the VAE server based on the at least one of the V2X service identifier and/or the identifier of the geographical area, as discussed above, for example, with respect to message/operation 1140 of FIG. 11.

At block 2620, processing circuitry 2003 transmits, via network interface 2007, a V2X uplink message reception report to the VAE server (responsive to receiving the V2X uplink message), as discussed above, for example, with respect to operation/message 1150 of FIG. 11.

In some embodiments, the registration request message includes a Quality of Service, QoS, registration request message, and the registration response message includes a QoS registration response message. The QoS registration request message can include a QoS sustainability analytics registration request message, and the QoS registration response message can include a QoS sustainability analytics registration response message. In some examples (e.g., as shown in FIG. 12), the QoS sustainability analytics registration request message includes at least one of an identifier of the V2X application specific server, an indication whether QoS sustainability analytics notifications should be provided to a VAE client device, a V2X service identifier to which the V2X application specific server registers, an identifier of a geographical area to which the V2X application specific server registers, information of the V2X application specific server to receive QoS sustainability analytics notifications, and/or analytics filter information.

In additional or alternative embodiments, processing circuitry 2003 communicates, via network interface 2007, QoS sustainability analytics information between the VAE server and the V2X application specific server based on information from the QoS registration request message.

In additional or alternative embodiments, the QoS registration request message includes a QoS change based on extended next generation radio access network, NG-RAN, notification registration request message, and the QoS registration response message includes a QoS change based on extended NG-RAN notification registration response message. In some embodiments (e.g., as shown in FIG. 15), the QoS change based on extended NG-RAN notification registration request message can include at least one of an identifier of the V2X application specific server, an indication whether QoS change based on extended NG-RAN notification should be provided to a VAE client device, a V2X service identifier to which the V2X application specific server registers, an identifier of a geographical area to which the V2X application specific server registers, information of the V2X application specific server to receive QoS change based on extended NG-RAN notification, and/or alternative service requirements.

In additional or alternative embodiments, processing circuitry 2003 communicates, via network interface 2007, QoS change based on extended NG-RAN notification between the VAE server and the V2X application specific server based on information from the QoS registration request message.

In additional or alternative embodiments, processing circuitry 2003 communicates, via network interface 2007, a QoS communication between the VAE server and the V2X application specific server based on information from the QoS registration request message.

Various operations from the flow charts of FIG. 24-26 may be optional with respect to some embodiments of V2X application specific servers and related methods. Regarding methods of Embodiment 23, for example, operations of blocks 2510 and 2520 of FIG. 25 and blocks 2610 and 2620 of FIG. 26 may be optional.

Explanations are provided below for various abbreviations/acronyms used in the present disclosure.

| Abbreviation | Explanation |
|---|---|
| V2X AS | V2X application server |
| VAE | V2X Application Enabler |
| V2X UE | User equipment |
| ITS | Intelligent Transport Systems |
| ITS-S | ITS Station |
| V2X | Vehicle to everything |
| VAL | Vertical application layer |

References are identified below.

Reference [1] 3GPP TS 23.286, Application layer support for V2X services; Functional architecture and information flows, V16.1.0, September 2019.

Reference [2] 3GPP TS 23.434, Service Enabler Architecture Layer for Verticals; Functional architecture and information flows, V16.1.0, September 2019.

Reference [3] 3GPP TR 23.795, Study on application layer support for V2X services, V16.1.0, December 2018.

Reference [4] 3GPP TR 23.764, Study on enhancements to application layer support for V2X services, V0.2.0, September 2019.

In view of the above, embodiments provided by the present disclosure include:

Embodiment 1. A method of operating a vehicle to anything, V2X, application enabler, VAE, server, the method comprising:

receiving (2110) a registration request message from a V2X application specific server; and transmitting (2120) a registration response message to the V2X application specific server responsive to receiving the registration request message.

Embodiment 2. The method of Embodiment 1, wherein the registration request message is received using a service application programming interface, API, and wherein the registration response message is transmitted using the service API.

Embodiment 3. The method of any of Embodiments 1-2, wherein the registration request message comprises a V2X application specific server registration request message, and wherein the registration response message comprises a V2X application specific server registration response message.

Embodiment 4. The method of any of Embodiment 3, wherein the V2X application specific server registration request message comprises at least one of an identifier of the V2X application specific server that is used to communicate uplink messages, a V2X service identifier to which the V2X application specific server registers, an identifier of a geographical area to which the V2X application specific server registers, and/or information of the V2X application specific server used to receive notifications.

Embodiment 5. The method of Embodiment 3, wherein the V2X application specific server registration request message comprises at least one of a V2X service identifier to which the V2X application specific server registers and/or an identifier of a geographical area to which the V2X application specific server registers.

Embodiment 6. The method of Embodiment 5, wherein the V2X application specific server registration request message comprises a request to register to receive uplink messages at the V2X application specific server from the VAE server based on the at least one of the V2X service identifier and/or the identifier of the geographical area.

Embodiment 7. The method of Embodiment 6 further comprising:

transmitting (2240) an uplink message from the VAE server to the V2X application specific server based on the at least one of the V2X service identifier and/or the identifier of the geographical area.

Embodiment 8. The method of Embodiment 7 further comprising:

after transmitting the V2X application specific server registration response message, receiving (2210) a V2X downlink message from the V2X application specific server;

responsive to receiving the V2X downlink message, transmitting (2220) the V2X downlink message to a V2X user equipment, UE, device; and after transmitting the V2X downlink message, receiving (2230) a V2X message reception report from the V2X UE device, wherein the V2X message reception report corresponds to the V2X downlink message;

wherein transmitting the uplink message comprises transmitting the V2X message reception report from the VAE server to the V2X application specific server.

Embodiment 9. The method of Embodiment 8, wherein the V2X downlink message is associated with at least one of the V2X service identifier and/or the identifier of the geographical area, wherein transmitting the V2X downlink message comprises transmitting the V2X downlink message to the V2X UE device based on the at least one of the V2X service identifier and/or the identifier of the geographical area associated with the V2X downlink message, and wherein the V2X message reception report is transmitted to the V2X application specific server based on the at least one of the V2X service identifier and/or the identifier of the geographical area associated with the V2X downlink message.

Embodiment 10. The method of any of Embodiments 8-9, wherein the V2X downlink message comprises a downlink V2X group message to be distributed to a plurality of V2X UE devices based on a V2X group identifier included in the downlink V2X group message, and wherein transmitting the downlink V2X group message comprise transmitting the downlink V2X group message to the plurality of V2X UE devices.

Embodiment 11. The method of Embodiment 6 further comprising:

receiving (2310) a V2X uplink message from a V2X, user equipment, UE device; and responsive to receiving the V2X uplink message from the V2X UE device, transmitting (2320) the V2X uplink message from the VAE server to the V2X application specific server based on the at least one of the V2X service identifier and/or the identifier of the geographical area.

Embodiment 12. The method of Embodiment 11 further comprising:

after transmitting the uplink message, receiving (2330) a V2X uplink message reception report from the V2X application specific server, wherein the V2X uplink message reception report is associated with the V2X uplink message; and responsive to receiving the V2X uplink message reception report, transmitting (2340) the V2X uplink message transmission report to the V2X UE device based on the at least one of the V2X service identifier and/or the identifier of the geographical area.

Embodiment 13. The method of any of Embodiments 1-2, wherein the registration request message comprises a Quality of Service, QoS, registration request message, and wherein the registration response message comprises a QoS registration response message.

Embodiment 14. The method of Embodiment 13, wherein the QoS registration request message comprises a QoS sustainability analytics registration request message, and wherein the QoS registration response message comprises a QoS sustainability analytics registration response message.

Embodiment 15. The method of Embodiment 14, wherein the QoS sustainability analytics registration request message comprises at least one of an identifier of the V2X application specific server, an indication whether QoS sustainability analytics notifications should be provided to a VAE client device, a V2X service identifier to which the V2X application specific server registers, an identifier of a geographical area to which the V2X application specific server registers, information of the V2X application specific server to receive QoS sustainability analytics notifications, and/or analytics filter information.

Embodiment 16. The method of any of Embodiments 14-15, further comprising:

communicating QoS sustainability analytics information between the VAE server and the V2X application specific server based on information from the QoS registration request message.

Embodiment 17. The method of Embodiment 13, wherein the QoS registration request message comprises a QoS change based on extended next generation radio access network, NG-RAN, notification registration request message, and wherein the QoS registration response message comprises a QoS change based on extended NG-RAN notification registration response message.

Embodiment 18. The method of Embodiment 17, wherein the QoS change based on extended NG-RAN notification registration request message comprises at least one of an identifier of the V2X application specific server, an indication whether QoS change based on extended NG-RAN notification should be provided to a VAE client device, a V2X service identifier to which the V2X application specific server registers, an identifier of a geographical area to which the V2X application specific server registers, information of the V2X application specific server to receive QoS change based on extended NG-RAN notification, and/or alternative service requirements.

Embodiment 19. The method of any of Embodiments 17-18, further comprising:

communicating QoS change based on extended NG-RAN notification between the VAE server and the V2X application specific server based on information from the QoS registration request message.

Embodiment 20. The method of Embodiment 13 further comprising:

communicating a QoS communication between the VAE server and the V2X application specific server based on information from the QoS registration request message.

Embodiment 21. The method of any of Embodiments 1-20, wherein the registration response message includes an indication of a result of registration responsive to the registration request message.

Embodiment 22. The method of Embodiment 21, wherein the indication of the result indicates one of success or failure of registration responsive to the registration request message.

Embodiment 23. A method of operating a vehicle to anything, V2X, application specific server, the method comprising:

transmitting (2410) a registration request message to a vehicle to anything, V2X, application enabler, VAE, server; and receiving (2420) a registration response message from the VAE server, wherein the registration response message is responsive to the registration request message.

Embodiment 24. The method of Embodiment 23, wherein the registration request message is transmitted using a service application programming interface, API, and wherein the registration response message is received using the service API.

Embodiment 25. The method of any of Embodiments 23-24, wherein the registration request message comprises a V2X application specific server registration request message, and wherein the registration response message comprises a V2X application specific server registration response message.

Embodiment 26. The method of any of Embodiment 25, wherein the V2X application specific server registration request message comprises at least one of an identifier of the V2X application specific server that is used to communicate uplink messages, a V2X service identifier to which the V2X application specific server registers, an identifier of a geographical area to which the V2X application specific server registers, and/or information of the V2X application specific server used to receive notifications.

Embodiment 27. The method of Embodiment 25, wherein the V2X application specific server registration request message comprises at least one of a V2X service identifier to which the V2X application specific server registers and/or an identifier of a geographical area to which the V2X application specific server registers.

Embodiment 28. The method of Embodiment 27, wherein the V2X application specific server registration request message comprises a request to register to receive uplink messages at the V2X application specific server from the VAE server based on the at least one of the V2X service identifier and/or the identifier of the geographical area.

Embodiment 29. The method of Embodiment 28 further comprising:

receiving (2520) an uplink message from the VAE server based on the at least one of the V2X service identifier and/or the identifier of the geographical area.

Embodiment 30. The method of Embodiment 29 further comprising:

after receiving the V2X application specific server registration response message, transmitting (2510) a V2X downlink message from the V2X application specific server;

wherein receiving the uplink message comprises receiving a V2X message reception report from the VAE server, wherein the V2X message reception report corresponds to the V2X downlink message.

Embodiment 31. The method of Embodiment 30, wherein the V2X downlink message is associated with at least one of the V2X service identifier and/or the identifier of the geographical area, and wherein the V2X message reception report is received from the VAE server based on the at least one of the V2X service identifier and/or the identifier of the geographical area associated with the V2X downlink message.

Embodiment 32. The method of any of Embodiments 30-31, wherein the V2X downlink message comprises a downlink V2X group message to be distributed to a plurality of V2X UE devices based on a V2X group identifier included in the downlink V2X group message.

Embodiment 33. The method of Embodiment 28 further comprising:

receiving (2610) a V2X uplink message from the VAE server based on the at least one of the V2X service identifier and/or the identifier of the geographical area.

Embodiment 34. The method of Embodiment 33 further comprising:

responsive to receiving the V2X uplink message, transmitting (2620) a V2X uplink message reception report to the VAE server.

Embodiment 35. The method of any of Embodiments 23-24, wherein the registration request message comprises a Quality of Service, QoS, registration request message, and wherein the registration response message comprises a QoS registration response message.

Embodiment 36. The method of Embodiment 35, wherein the QoS registration request message comprises a QoS sustainability analytics registration request message, and wherein the QoS registration response message comprises a QoS sustainability analytics registration response message.

Embodiment 37. The method of Embodiment 36, wherein the QoS sustainability analytics registration request message comprises at least one of an identifier of the V2X application specific server, an indication whether QoS sustainability analytics notifications should be provided to a VAE client device, a V2X service identifier to which the V2X application specific server registers, an identifier of a geographical area to which the V2X application specific server registers, information of the V2X application specific server to receive QoS sustainability analytics notifications, and/or analytics filter information.

Embodiment 38. The method of any of Embodiments 36-37, further comprising:

communicating QoS sustainability analytics information between the VAE server and the V2X application specific server based on information from the QoS registration request message.

Embodiment 39. The method of Embodiment 35, wherein the QoS registration request message comprises a QoS change based on extended next generation radio access network, NG-RAN, notification registration request message, and wherein the QoS registration response message comprises a QoS change based on extended NG-RAN notification registration response message.

Embodiment 40. The method of Embodiment 39, wherein the QoS change based on extended NG-RAN notification registration request message comprises at least one of an identifier of the V2X application specific server, an indication whether QoS change based on extended NG-RAN notification should be provided to a VAE client device, a V2X service identifier to which the V2X application specific server registers, an identifier of a geographical area to which the V2X application specific server registers, information of the V2X application specific server to receive QoS change based on extended NG-RAN notification, and/or alternative service requirements.

Embodiment 41. The method of any of Embodiments 39-40, further comprising:

communicating QoS change based on extended NG-RAN notification between the VAE server and the V2X application specific server based on information from the QoS registration request message.

Embodiment 42. The method of Embodiment 35 further comprising:

communicating a QoS communication between the VAE server and the V2X application specific server based on information from the QoS registration request message.

Embodiment 43. The method of any of Embodiments 23-42, wherein the registration response message includes an indication of a result of registration responsive to the registration request message.

Embodiment 44. The method of Embodiment 43, wherein the indication of the result indicates one of success or failure of registration responsive to the registration request message.

Embodiment 45. A Vehicle to anything, V2X, Application enabler, VAE, server (1900) comprising:

processing circuitry (1903); and memory (1905) coupled with the processing circuitry, wherein the memory includes instructions that when executed by the processing circuitry causes the VAE server to perform operations according to any of Embodiments 1-22.

Embodiment 46. A Vehicle to anything, V2X, Application enabler, VAE, server (1900) adapted to perform according to any of Embodiments 1-22.

Embodiment 47. A computer program comprising program code to be executed by processing circuitry (1903) of a Vehicle to anything, V2X, Application enabler, VAE, server (1900), whereby execution of the program code causes the VAE server (1900) to perform operations according to any of embodiments 1-22.

Embodiment 48. A computer program product comprising a non-transitory storage medium including program code to be executed by processing circuitry (1903) of a Vehicle to anything, V2X, Application enabler, VAE, server (1900), whereby execution of the program code causes the VAE server (1900) to perform operations according to any of embodiments 1-22.

Embodiment 49. A Vehicle to anything, V2X, application specific server (2000) comprising:

processing circuitry (2003); and memory (2005) coupled with the processing circuitry, wherein the memory includes instructions that when executed by the processing circuitry causes the V2X application specific server (2000) to perform operations according to any of Embodiments 23-44.

Embodiment 50. A Vehicle to anything, V2X, application specific server (2000) adapted to perform according to any of Embodiments 23-44.

Embodiment 51. A computer program comprising program code to be executed by processing circuitry (2003) of a Vehicle to anything, V2X, application specific server (2000), whereby execution of the program code causes the V2X application specific server (2000) to perform operations according to any of embodiments 23-44.

Embodiment 52. A computer program product comprising a non-transitory storage medium including program code to be executed by processing circuitry (2003) of a Vehicle to anything, V2X, application specific server (2000), whereby execution of the program code causes the V2X application specific server (2000) to perform operations according to any of embodiments 23-44.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
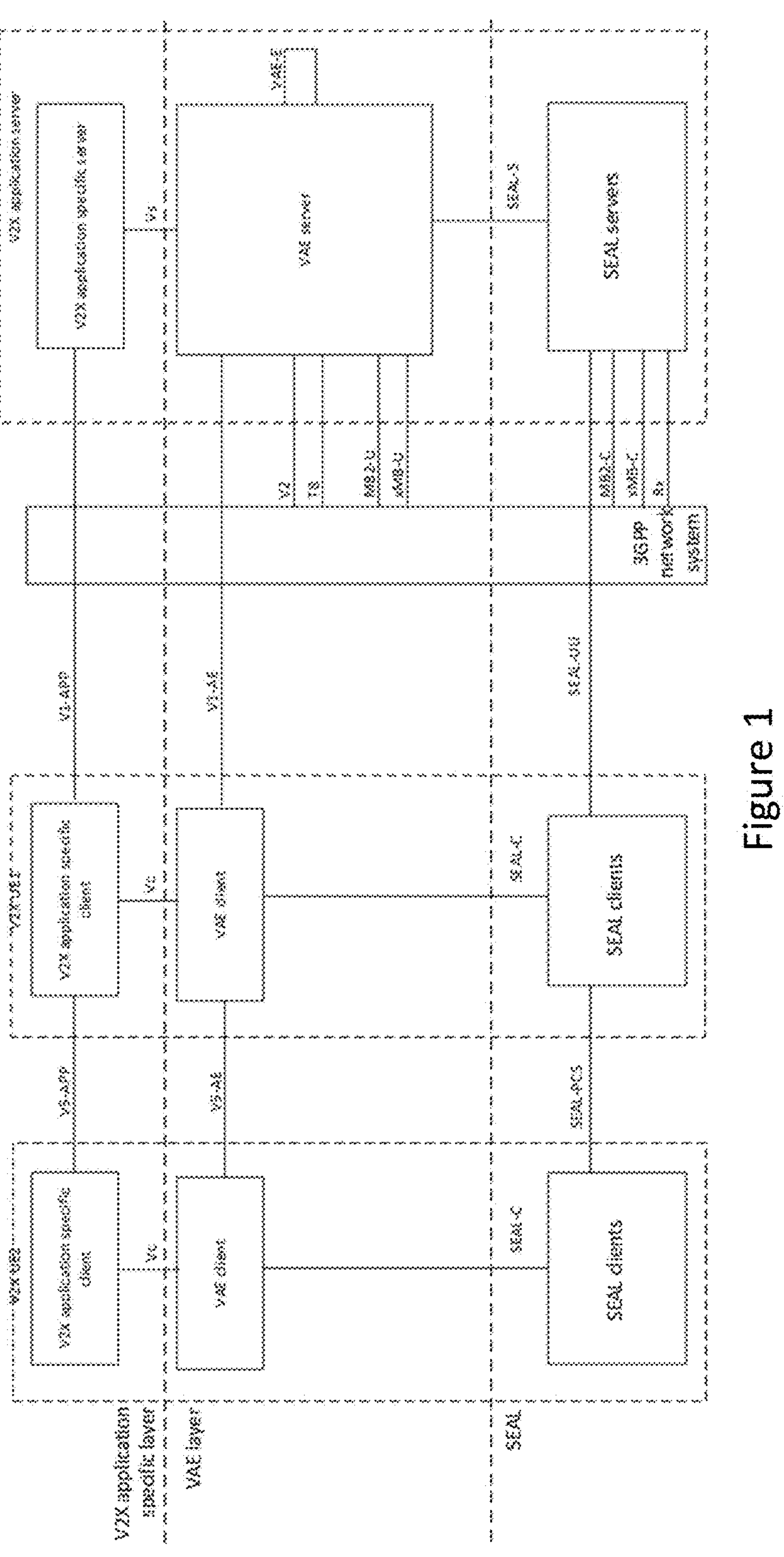
FIG. 1 is a block diagram illustrating an example of a V2X application layer model according to some embodiments of inventive concepts.

FIG. 27 1 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 27. For simplicity, the wireless network of FIG. 27 only depicts network QQ106, network nodes QQ160 and QQ160*b*, and WDs QQ110, QQ110*b*, and QQ110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 27, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 271 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 27 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 28:
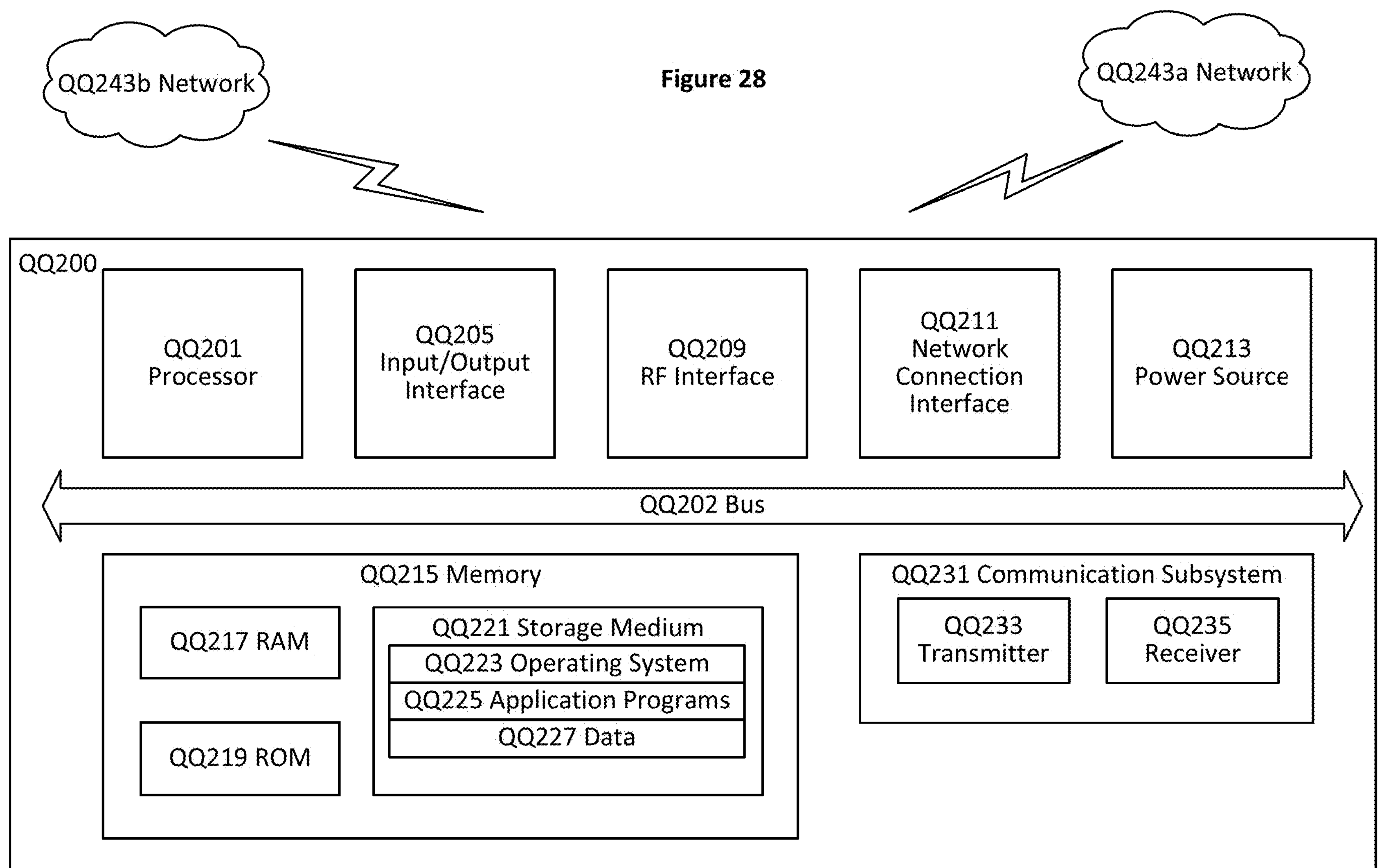
FIG. 28 is a block diagram of a user equipment in accordance with some embodiments

FIG. 28 illustrates a user Equipment in accordance with some embodiments.

FIG. 28 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 28, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 28 is a UE, the components discussed herein are equally applicable to a WD, and vice-versa.

In FIG. 28, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 28, or only a subset of the components. The level of integration between the components may vary from one UE to another UE. Further, certain UEs may contain multiple instances of a component, such as multiple processors, memories, transceivers, transmitters, receivers, etc.

In FIG. 28, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 28, RF interface QQ209 may be configured to provide a communication interface to RF components such as a transmitter, a receiver, and an antenna. Network connection interface QQ211 may be configured to provide a communication interface to network QQ243*a*. Network QQ243*a* may encompass wired and/or wireless networks such as a local-area network (LAN), a wide-area network (WAN), a computer network, a wireless network, a telecommunications network, another like network or any combination thereof. For example, network QQ243*a* may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 28, processing circuitry QQ201 may be configured to communicate with network QQ243*b* using communication subsystem QQ231. Network QQ243*a* and network QQ243*b* may be the same network or networks or different network or networks. Communication subsystem QQ231 may be configured to include one or more transceivers used to communicate with network QQ243*b*. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802. QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243*b* may encompass wired and/or wireless networks such as a local-area network (LAN), a wide-area network (WAN), a computer network, a wireless network, a telecommunications network, another like network or any combination thereof. For example, network QQ243*b* may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

FIG. 29 illustrates a virtualization environment in accordance with some embodiments.

FIG. 29 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 29, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 29.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 30:
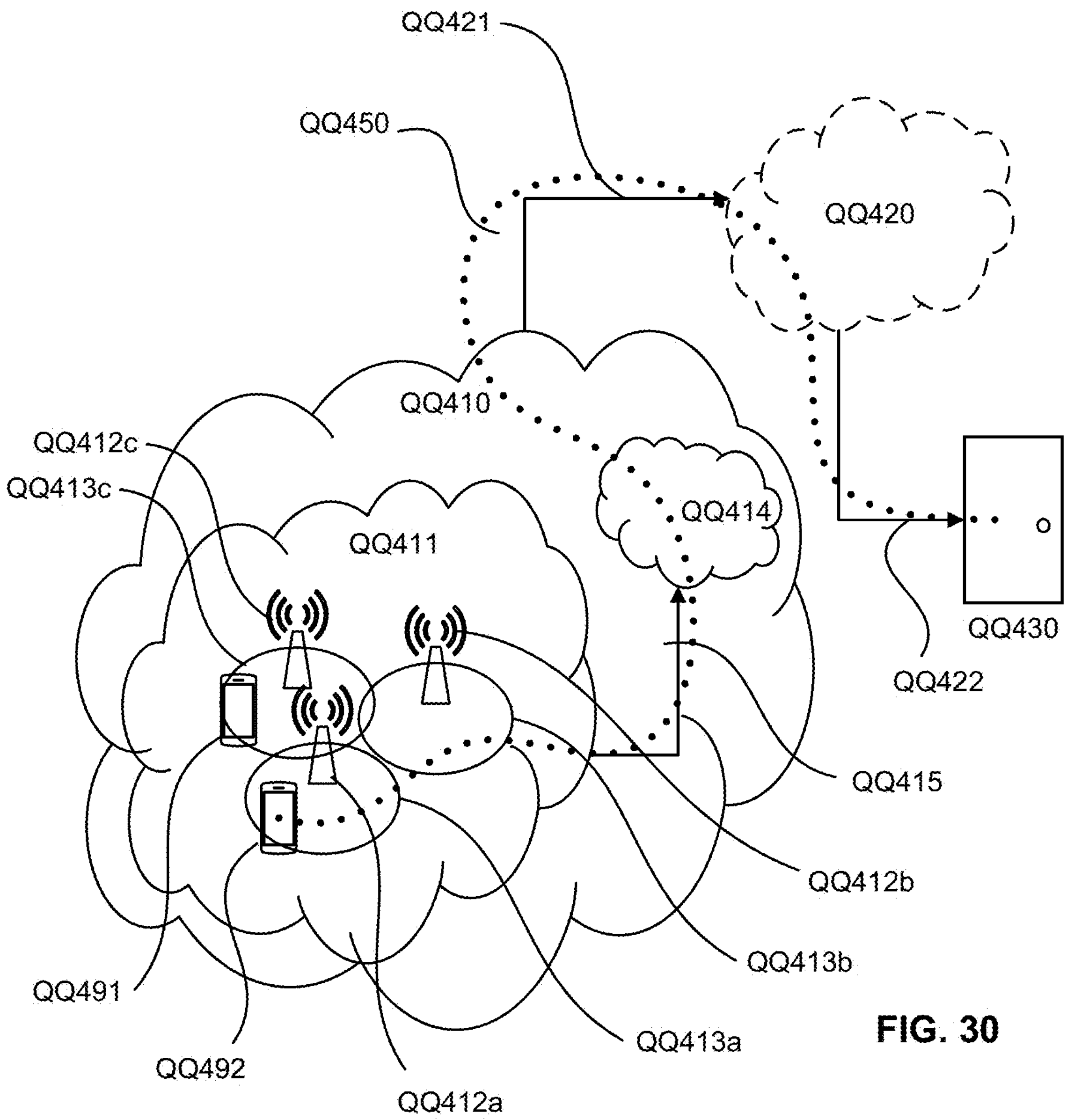
FIG. 30 is a block diagram of a telecommunication network connected via an intermediate network to a host computer in accordance with some embodiments.

FIG. 30 illustrates a telecommunication network connected via an intermediate network to a host computer in accordance with some embodiments.

With reference to FIG. 30, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412*a*, QQ412*b*, QQ412*c*, such as NBs, eNBs, gNBs or other types of wireless access points, each defining a corresponding coverage area QQ413*a*, QQ413*b*, QQ413*c*. Each base station QQ412*a*, QQ412*b*, QQ412*c* is connectable to core network QQ414 over a wired or wireless connection QQ415. A first UE QQ491 located in coverage area QQ413*c* is configured to wirelessly connect to, or be paged by, the corresponding base station QQ412*c*. A second UE QQ492 in coverage area QQ413*a* is wirelessly connectable to the corresponding base station QQ412*a*. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 30 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 31:
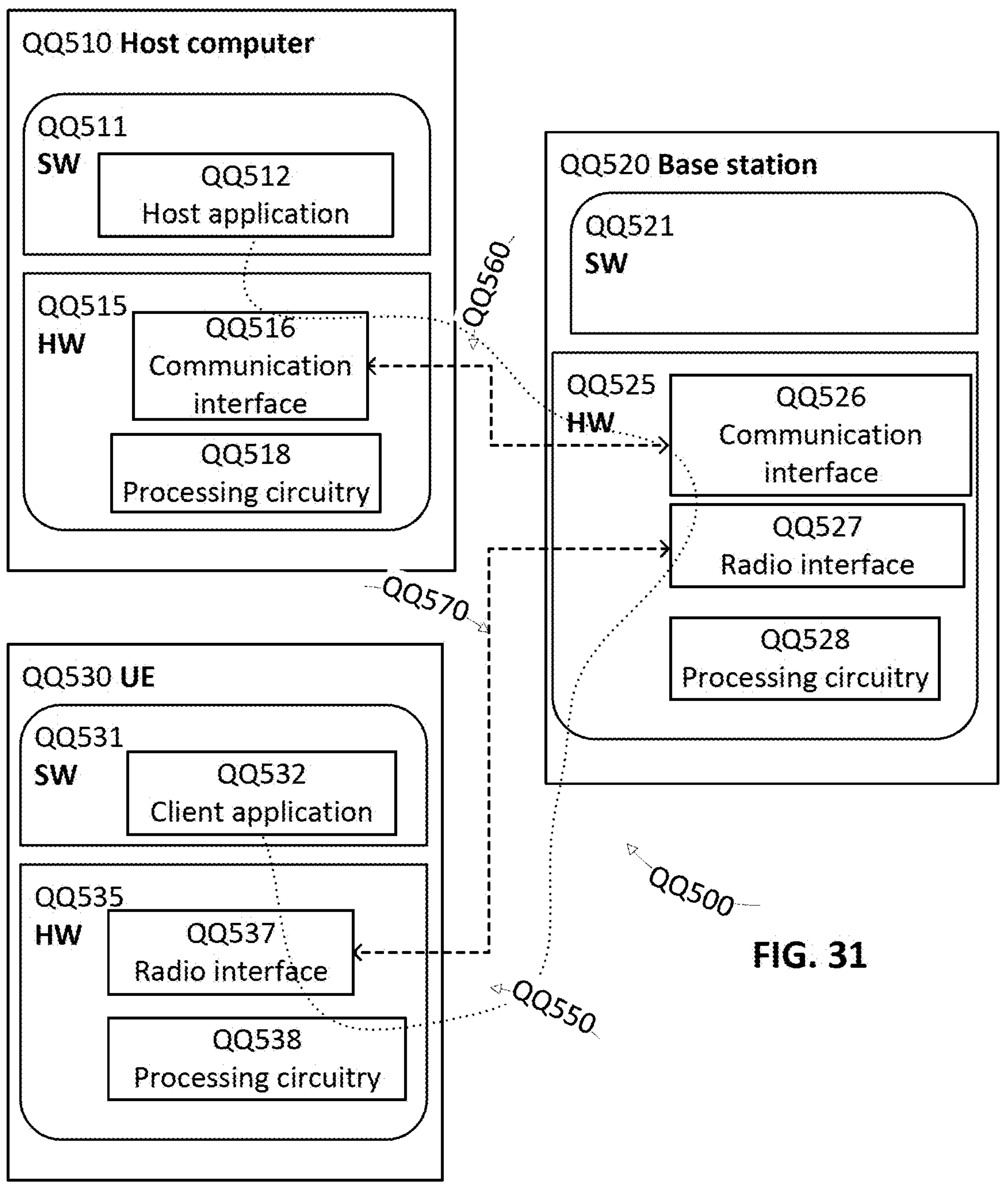
FIG. 31 is a block diagram of a host computer communicating via a base station with a user equipment over a partially wireless connection in accordance with some embodiments.

FIG. 31 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 31. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 31) served by base station QQ520. Communication interface QQ526 may be configured to facilitate connection QQ560 to host computer QQ510. Connection QQ560 may be direct or it may pass through a core network (not shown in FIG. 31) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 31 may be similar or identical to host computer QQ430, one of base stations QQ412*a*, QQ412*b*, QQ412*c* and one of UEs QQ491, QQ492 of FIG. 30, respectively. This is to say, the inner workings of these entities may be as shown in FIG. 31 and independently, the surrounding network topology may be that of FIG. 30.

In FIG. 31, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 32:
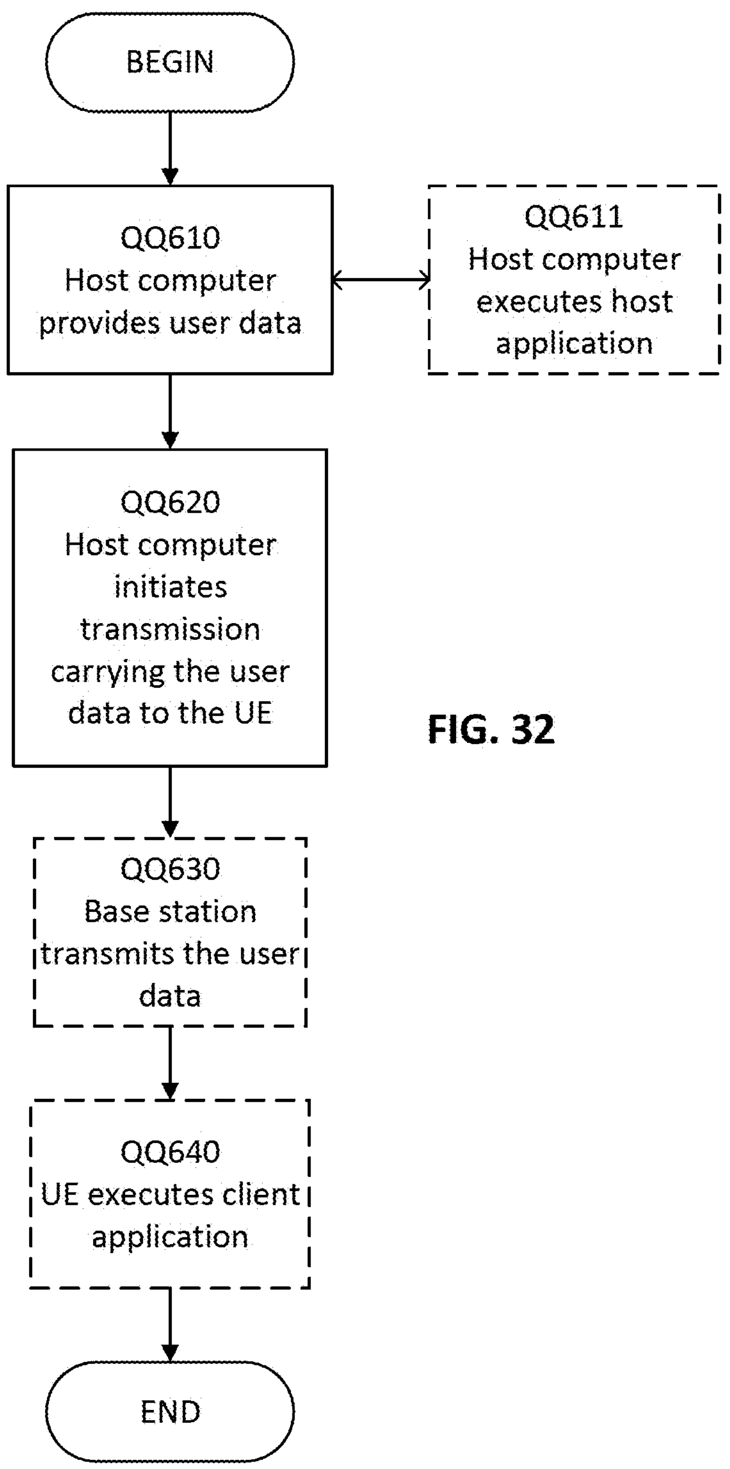
FIG. 32 is a block diagram of methods implemented in a communication system including a host computer, a base station and a user equipment in accordance with some embodiments.

FIG. 32 illustrates methods implemented in a communication system including a host computer, a base station and a user equipment in accordance with some embodiments FIG. 32 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 32 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 33:
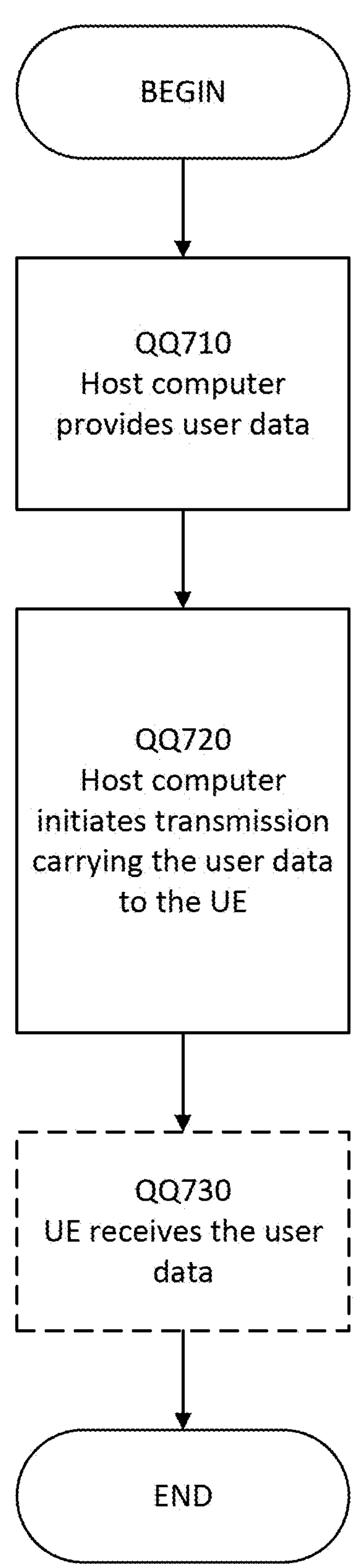
FIG. 33 is a block diagram of methods implemented in a communication system including a host computer, a base station and a user equipment in accordance with some embodiments.

FIG. 33 illustrates methods implemented in a communication system including a host computer, a base station and a user equipment in accordance with some embodiments.

FIG. 33 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 33 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 34:
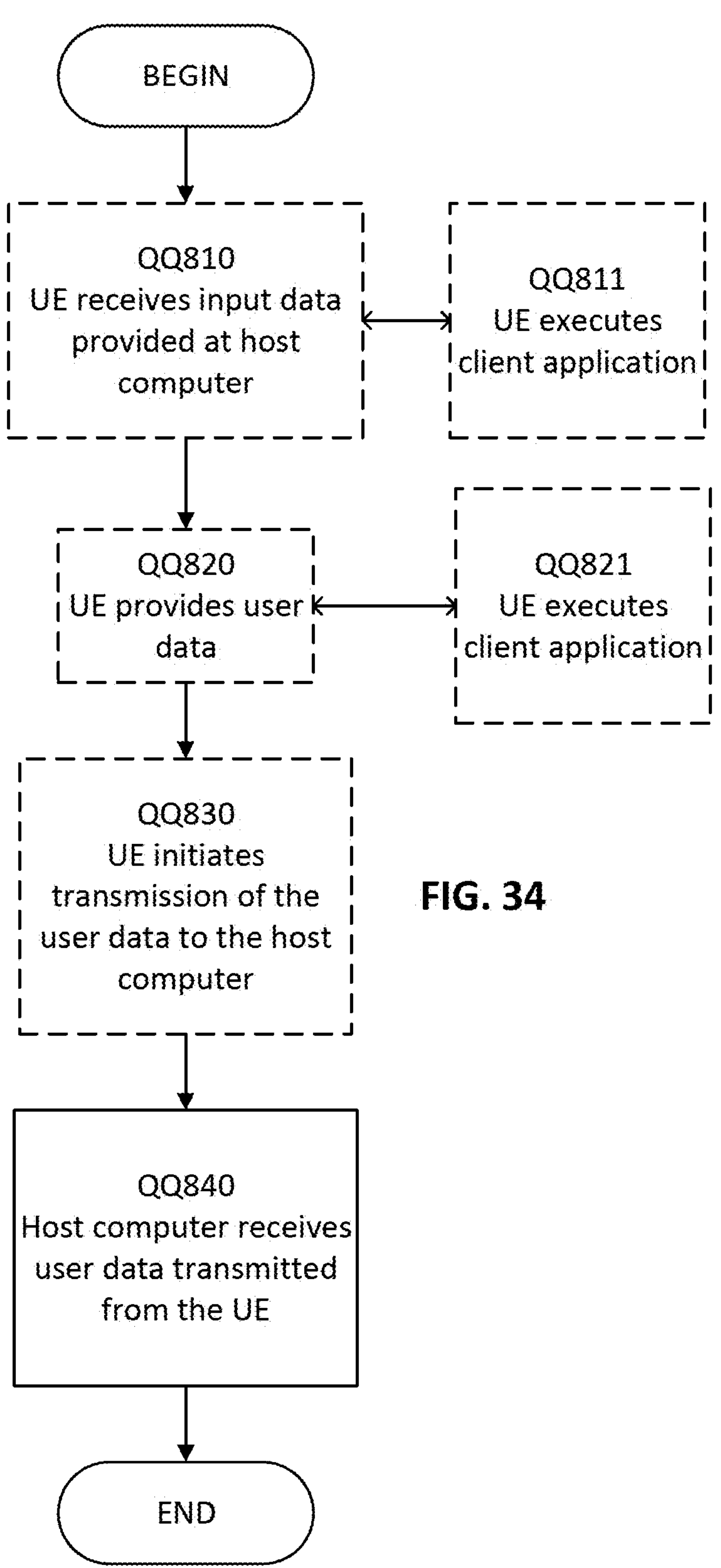
FIG. 34 is a block diagram of methods implemented in a communication system including a host computer, a base station and a user equipment in accordance with some embodiments.

FIG. 34 illustrates methods implemented in a communication system including a host computer, a base station and a user equipment in accordance with some embodiments FIG. 34 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 34 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 35:
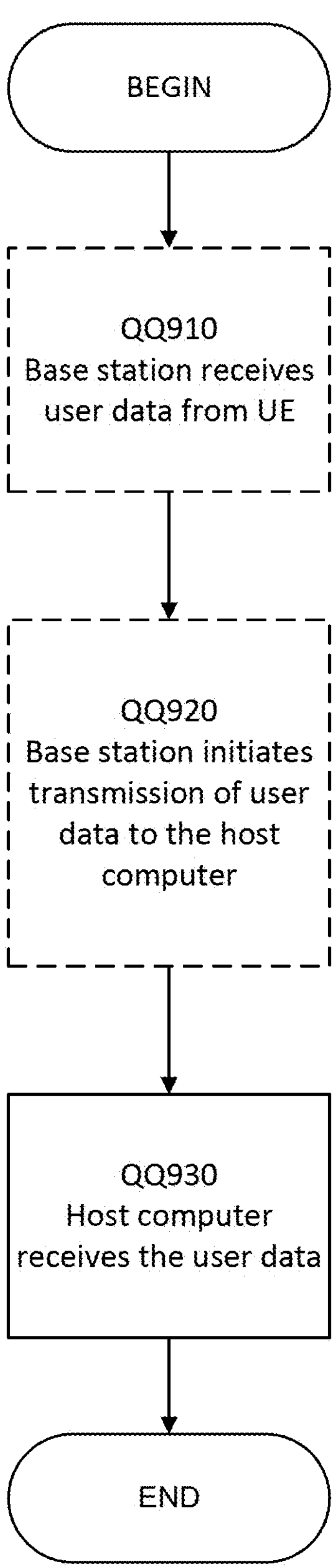
FIG. 35 is a block diagram of methods implemented in a communication system including a host computer, a base station and a user equipment in accordance with some embodiments.

FIG. 35 illustrates methods implemented in a communication system including a host computer, a base station and a user equipment in accordance with some embodiments FIG. 35 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 35 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICHCommon Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a vehicle to anything ("V2X") application enabler ("VAE") server, the method comprising:

receiving a subscribe V2X message delivery request from a V2X application specific server, the subscribe V2X message delivery request comprising:

an identifier of the V2X application specific server that is used to communicate V2X uplink messages originating from a V2X user equipment ("UE") device, and at least one of:

a V2X service identifier to which the V2X application specific server subscribes; and an identifier of a geographical area to which the V2X application specific server subscribes, wherein the subscribe V2X message delivery request is a request to subscribe to receive V2X uplink messages originating from a V2X UE device at the V2X application specific server from the VAE server based on the V2X service identifier and/or the identifier of the geographical area; and responsive to receiving the subscribe V2X message delivery request, transmitting a subscribe V2X message delivery response to the V2X application specific server.

2. The method of claim 1, wherein receiving the subscribe V2X message delivery request comprises receiving the subscribe V2X message delivery request using a service application programming interface ("API"), and wherein transmitting the subscribe V2X message delivery response comprises transmitting the subscribe V2X message delivery response using the service API.

3. The method of claim 1, wherein the subscribe V2X message delivery request further comprises information of the V2X application specific server used to receive notifications.

4. The method of claim 1, further comprising:

receiving a V2X uplink message originating from a V2X UE device; and responsive to receiving the V2X uplink message, transmitting the V2X uplink message to the V2X application specific server based on at least one of the V2X service identifier and the identifier of the geographical area.

5. The method of claim 1, wherein the subscribe V2X message delivery response includes an indication of a result of subscription responsive to the subscribe V2X message delivery request, and wherein the indication of the result indicates one of success or failure of subscription responsive to the subscribe V2X message delivery request.

6. A method of operating a vehicle to anything ("V2X") application specific server, the method comprising:

transmitting a subscribe V2X message delivery request to a V2X application enabler ("VAE") server, the subscribe V2X message delivery request comprising:

an identifier of the V2X application specific server that is used to communicate V2X uplink messages originating from a V2X user equipment ("UE") device, and at least one of:

a V2X service identifier to which the V2X application specific server subscribes; and an identifier of a geographical area to which the V2X application specific server subscribes, wherein the subscribe V2X message delivery request is a request to subscribe to receive V2X uplink messages originating from a V2X UE device at the V2X application specific server from the VAE server based on the V2X service identifier and/or the identifier of the geographical area; and responsive to transmitting the subscribe V2X message delivery request, receiving a subscribe V2X message delivery response from the VAE server.

7. The method of claim 6, wherein transmitting the subscribe V2X message delivery request comprises transmitting the subscribe V2X message delivery request using a service application programming interface ("API"), and wherein receiving the subscribe V2X message delivery response comprises receiving the subscribe V2X message delivery response using the service API.

8. The method of claim 6, wherein the subscribe V2X message delivery request further comprises information of the V2X application specific server used to receive notifications.

9. The method of claim 6, further comprising:

receiving a V2X uplink message originating from a V2X UE device from the VAE server based on at least one of the V2X service identifier and the identifier of the geographical area.

10. The method of claim 6, wherein the subscribe V2X message delivery response includes an indication of a result of subscription responsive to the subscribe V2X message delivery request, and wherein the indication of the result indicates one of success or failure of subscription responsive to the subscribe V2X message delivery request.

11. A vehicle to anything ("V2X") application enabler ("VAE") server comprising:

processing circuitry; and memory coupled to the processing circuitry and having instructions stored therein that are executable by the processing circuitry to cause the VAE server to perform operations comprising:

receiving a subscribe V2X message delivery request from a V2X application specific server, the subscribe V2X message delivery request comprising:

an identifier of the V2X application specific server that is used to communicate V2X uplink messages originating from a V2X user equipment ("UE") device, and at least one of:

a V2X service identifier to which the V2X application specific server subscribes; and an identifier of a geographical area to which the V2X application specific server subscribes, wherein the subscribe V2X message delivery request is a request to subscribe to receive V2X uplink messages originating from a V2X UE device at the V2X application specific server from the VAE server based on the V2X service identifier and/or the identifier of the geographical area; and responsive to receiving the subscribe V2X message delivery request, transmitting a subscribe V2X message delivery response to the V2X application specific server.

12. The VAE server of claim 11, wherein transmitting the subscribe V2X message delivery request comprises transmitting the subscribe V2X message delivery request using a service application programming interface ("API"), wherein receiving the subscribe V2X message delivery response comprises receiving the subscribe V2X message delivery response using the service API.

13. The VAE server of claim 11, the operations further comprising:

receiving a V2X uplink message originating from a V2X UE device; and responsive to receiving the V2X uplink message originating from the V2X UE device, transmitting the V2X uplink message to the V2X application specific server based on at least one of the V2X service identifier and the identifier of the geographical area.

14. The VAE server of claim 11, wherein the subscribe V2X message delivery response includes an indication of a result of subscription responsive to the subscribe V2X message delivery request, and wherein the indication of the result indicates one of success or failure of subscription responsive to the subscribe V2X message delivery request.

15. The VAE server of claim 11, wherein the subscribe V2X message delivery request further comprises information of the V2X application specific server used to receive notifications.

16. A vehicle to anything ("V2X") application specific server comprising:

processing circuitry; and memory coupled to the processing circuitry and having instructions stored therein that are executable by the processing circuitry to cause the V2X application specific server to perform operations comprising:

transmitting a subscribe V2X message delivery request to a V2X application enabler ("VAE") server, the subscribe V2X message delivery request comprising:

an identifier of the V2X application specific server that is used to communicate V2X uplink messages originating from a V2X user equipment ("UE") device, and at least one of:

a V2X service identifier to which the V2X application specific server subscribes; and an identifier of a geographical area to which the V2X application specific server subscribes, wherein the subscribe V2X message delivery request is a request to subscribe to receive V2X uplink messages originating from a V2X UE device at the V2X application specific server from the VAE server based on the V2X service identifier and/or the identifier of the geographical area; and responsive to transmitting the subscribe V2X message delivery request, receiving a subscribe V2X message delivery response from the VAE server.

17. The V2X application specific server of claim 16, the operations further comprising:

receiving a V2X uplink message originating from a V2X UE device from the VAE server based on at least one of the V2X service identifier and the geographical area, wherein receiving the subscribe V2X message delivery request comprises receiving the subscribe V2X message delivery request using a service application programming interface ("API"), wherein transmitting the subscribe V2X message delivery response comprises transmitting the subscribe V2X message delivery response using the service API, wherein the subscribe V2X message delivery response includes an indication of a result of subscription responsive to the subscribe V2X message delivery request, and wherein the indication of the result indicates one of success or failure of subscription responsive to the subscribe V2X message delivery request.

18. The V2X application specific server of claim 16, wherein the subscribe V2X message delivery request further comprises information of the V2X application specific server used to receive notifications.

19. A non-transitory computer-readable medium having instructions stored therein that are executable by processing circuitry of a vehicle to anything ("V2X") application enabler ("VAE") server, to cause the VAE server to perform operations comprising:

receiving a subscribe V2X message delivery request from a V2X application specific server, the subscribe V2X message delivery request comprising:

an identifier of the V2X application specific server that is used to communicate V2X uplink messages originating from a V2X user equipment ("UE") device, and at least one of:

a V2X service identifier to which the V2X application specific server subscribes; and an identifier of a geographical area to which the V2X application specific server subscribes, wherein the subscribe V2X message delivery request is a request to subscribe to receive V2X uplink messages originating from a V2X UE device at the V2X application specific server from the VAE server based on the V2X service identifier and/or the identifier of the geographical area; and responsive to receiving the subscribe V2X message delivery request, transmitting a subscribe V2X message delivery response to the V2X application specific server.

20. A non-transitory computer-readable medium having instructions stored therein that are executable by processing circuitry of a vehicle to anything ("V2X") application specific server to cause the V2X application specific server to perform operations comprising:

transmitting a subscribe V2X message delivery request to a V2X application enabler ("VAE") server, the subscribe V2X message delivery request comprising:

an identifier of the V2X application specific server that is used to communicate V2X uplink messages originating from a V2X user equipment ("UE") device, and at least one of:

a V2X service identifier to which the V2X application specific server subscribes; and an identifier of a geographical area to which the V2X application specific server subscribes, wherein the subscribe V2X message delivery request is a request to subscribe to receive V2X uplink messages originating from a V2X UE device at the V2X application specific server from the VAE server based on the V2X service identifier and/or the identifier of the geographical area; and responsive to transmitting the subscribe V2X message delivery request, receiving a subscribe V2X message delivery response from the VAE server.

* * * * *